US011368960B2

United States Patent
Zhang

(10) Patent No.: US 11,368,960 B2
(45) Date of Patent: Jun. 21, 2022

(54) METHOD AND DEVICE IN UE AND BASE STATION FOR WIRELESS COMMUNICATION SUPPORTING POWER CONTROL OF AERIAL VEHICLES

(71) Applicant: XiaoBo Zhang, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 128 days.

(21) Appl. No.: 16/676,469

(22) Filed: Nov. 7, 2019

(65) Prior Publication Data
US 2020/0077405 A1    Mar. 5, 2020

Related U.S. Application Data

(63) Continuation of application No. PCT/CN2017/083709, filed on May 10, 2017.

(51) Int. Cl.
*H04W 72/04* (2009.01)
*H04L 5/00* (2006.01)
(Continued)

(52) U.S. Cl.
CPC ....... *H04W 72/0473* (2013.01); *H04L 5/0051* (2013.01); *H04L 25/0226* (2013.01);
(Continued)

(58) Field of Classification Search
CPC ............ H04W 72/0473; H04W 52/325; H04L 5/0051
See application file for complete search history.

(56) References Cited

U.S. PATENT DOCUMENTS

2015/0085723 A1* 3/2015 Chen ............... H04L 5/0094
370/280
2018/0049180 A1* 2/2018 Lee ............... H04W 72/048

FOREIGN PATENT DOCUMENTS

CN 102958148 A 3/2013
CN 104349441 A 2/2015
(Continued)

OTHER PUBLICATIONS

3GPP TS 36.213 V10.2.0 (Jun. 2011), "3rd Generation Partnership Project; Technical Specification Group Radio Access Network; Evolved Universal Terrestrial Radio Access (E-UTRA); Physical layer procedures (Release 10)", Jun. 2011, 120 pages. (Year: 2011).*

(Continued)

*Primary Examiner* — Hoon J Chung

(57) ABSTRACT

The disclosure provides a method and a device in a User Equipment (UE) and a base station for wireless communication. The UE transmits a first radio signal, wherein the first radio signal occupies W frequency unit(s) in frequency domain, a transmit power of the first radio signal is a first power, the first power is uncorrelated with the W, the W is a positive integer, and the W is configurable. The method in the disclosure makes better use of special channel characteristics of air communication to optimize the design of reference signals, reduces the power consumption of an air terminal while ensuring a channel estimated quality, and reduces interferences to neighbor cells or to ground users in neighbor cells.

16 Claims, 10 Drawing Sheets

(51) Int. Cl.
  *H04L 25/02* (2006.01)
  *H04L 27/26* (2006.01)
  *H04W 24/10* (2009.01)
  *H04W 52/24* (2009.01)
(52) U.S. Cl.
  CPC ......... *H04L 27/2607* (2013.01); *H04W 24/10* (2013.01); *H04W 52/242* (2013.01)

(56) References Cited

FOREIGN PATENT DOCUMENTS

| CN | 106465295 A | 2/2017 |
| WO | 2015147593 A1 | 10/2015 |

OTHER PUBLICATIONS

3GPP TS 36.211 V10.2.0 (Jun. 2011), "3rd Generation Partnership Project; Technical Specification Group Radio Access Network; Evolved Universal Terrestrial Radio Access (E-UTRA); Physical Channels and Modulation (Release 10)", Jun. 2011, 103 pages. (Year: 2011).*

ISR received in application No. PCT/CN2017/083709 dated Jan. 30, 2018.

* cited by examiner

First Signaling #0

| First Index | First Offset #0 |

First Field

⋮

First Signaling #R-1

| First Index | First Offset #R-1 |

First Power = Minimum one among {Limit Power, first Reference Power}

First Reference Power = Seventh Component x Third Component + Fourth Component + Fifth Component

⇑

$$\sum_{i=0}^{R-1} \text{First Offset \#i}$$

FIG.4

METHOD AND DEVICE IN UE AND BASE STATION FOR WIRELESS COMMUNICATION SUPPORTING POWER CONTROL OF AERIAL VEHICLES

CROSS-REFERENCE TO RELATED APPLICATION

This application is a continuation of International Application No. PCT/CN2017/083709, filed May 10, 2017, the full disclosure of which is incorporated herein by reference.

BACKGROUND

Technical Field

The disclosure relates to transmission methods and devices in wireless communication systems, and in particular to a transmission method and device in wireless communication supporting power control.

Related Art

In discussions about 5G in 3GPPP, a Study Item (SI) of Enhanced Support for Aerial Vehicles has been approved and discussed in 3GPP. One feature of air communication is that a channel between an air terminal and a ground terminal/base station is a Line of Sight (LOS), which needs to be taken into consideration in designs related to air communication.

SUMMARY

In conventional Long Term Evolution (LTE) systems, a transmit power of a bandwidth variable radio signal is correlated with a bandwidth occupied by the radio signal. The inventor finds through researches that this power control method cannot well utilize the feature in the air communication environment that a channel between an air terminal and a ground terminal/base station is an LOS.

In view of the above problems, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a User Equipment (UE) for wireless communication, wherein the method includes:

Step A: transmitting a first radio signal.

Herein, the first radio signal occupies W frequency unit(s) in frequency domain, a transmit power of the first radio signal is a first power, the first power is uncorrelated with the W, the W is a positive integer, and the W is configurable.

In one embodiment, the above method has the following benefits: the method can make better use of special channel characteristics of air communication to optimize the design of reference signals. For air communication, since the channel between an air terminal and a ground terminal/base station generally is an LOS, basically there is no frequency selective fading. It is only needed to estimate one channel fading coefficient on the entire frequency band; therefore, the power of the reference signal does not need to change with the occupied bandwidth. According to common general knowledges, the transmit power of the reference signal is in linear correlation with the occupied bandwidth. Compared with the common general knowledges, the above method reduces the power consumption of the air terminal while ensuring a channel estimated quality, and reduces interferences to neighbor cells or to ground users in neighbor cells.

In one embodiment, in existing wideband cellular systems, a transmit power of a bandwidth variable uplink radio signal is in linear correlation with a base-10 logarithm of the bandwidth (in unit of resource block) occupied by the uplink radio signal, wherein the bandwidth variable uplink radio signal includes at least one of uplink data, uplink control information or an uplink reference signal. The above method embodies the innovation of the disclosure.

In one embodiment, the bandwidth variable uplink radio signal is transmitted on an uplink physical layer data channel (that is, an uplink channel capable of carrying physical layer data); in existing LTE systems, the transmit power of the bandwidth variable uplink radio signal is determined by the following formula:

$$P_{PUSCH,c}(i) = \min\left\{\begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + \\ f_c(i) \end{array}\right\}$$

where the $M_{PUSCH,c}(i)$ is the bandwidth (in unit of resource block) occupied by the bandwidth variable uplink radio signal. Specific definitions of the $M_{PUSCH,c}(i)$, the $P_{PUSCH,c}(i)$, the $P_{C\ MAX,c}(i)$, the $P_{O\_PUSCH,c}(j)$, the $\alpha_c(j)$, the $PL_c$, the $\Delta_{TF,c}(i)$, and the $f_c(i)$ can refer to TS36.213. The above method embodies the innovation of the disclosure.

In one embodiment, the bandwidth variable uplink radio signal is transmitted on an uplink physical layer control channel (that is, an uplink channel capable of carrying physical layer signalings only); a Physical Uplink Control Channel (PUCCH) format corresponding to the bandwidth variable uplink radio signal belongs to Format 4 or 5; in existing LTE systems, the transmit power of the bandwidth variable uplink radio signal is determined by the following formula:

$$P_{PUCCH}(i) = \min\left\{\begin{array}{c} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array}\right\}$$

where the $M_{PUCCH,c}(i)$ is the bandwidth (in unit of resource block) occupied by the bandwidth variable uplink radio signal. Specific definitions of the $M_{PUCCH,c}(i)$, the $P_{PUCCH}(i)$, the $P_{0\_PUCCH}$, the $\Delta_{F\_PUCCH}(F)$ and the $g(i)$ can refer to TS36.213. The above method embodies the innovation of the disclosure.

In one embodiment, the bandwidth variable uplink radio signal includes a Sounding Reference Signal (SRS); in existing LTE systems, the transmit power of the bandwidth variable uplink radio signal is determined by the following formula:

$$P_{SRS,c}(i) = \min\left\{\begin{array}{c} P_{CMAX,c}(i), \\ P_{SRS\_OFFSET,c}(m) + 10\log_{10}(M_{SRS,c}) + P_{O\_PUSCH,c}(j) + \\ \alpha_c(j) \cdot PL_c + f_c(i) \end{array}\right\}$$

where the $M_{SRS,c}$ is the bandwidth (in unit of resource block) occupied by the bandwidth variable uplink radio signal. Specific definitions of the $M_{SRS,c}$, the $P_{SRS,c}(i)$, and the $P_{SRS\_OFFSET,c}(m)$ can refer to TS36.213. The above method embodies the innovation of the disclosure.

In one embodiment, in existing LTE systems, a transmit power of a bandwidth fixed uplink radio signal is determined by the following formula:

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix}$$

Herein, the bandwidth fixed uplink radio signal is transmitted on an uplink physical layer control channel (that is, an uplink channel capable of carrying physical layer signalings only), a PUCCH format corresponding to the bandwidth fixed uplink radio signal belongs to Format 1, 1a, 1b, 2, 2a, 2b or 3, and the bandwidth fixed uplink radio signal occupies a fixed bandwidth in frequency domain. Specific definitions of the $h(n_{CQI}, n_{HARQ}, n_{SR})$ and the $\Delta_{TxD}(F')$ can refers to TS36.213. The above method embodies the innovation of the disclosure.

In one embodiment, the W is configured dynamically.

In one embodiment, the W is configured semi-statically.

In one embodiment, the W is configured through a higher-layer signaling.

In one embodiment, the W is configured through a physical layer signaling.

In one embodiment, the first radio signal includes an uplink reference signal.

In one embodiment, the first radio signal includes a Sounding Reference Signal (SRS).

In one embodiment, the first radio signal includes an uplink Demodulation Reference Signal (DMRS).

In one embodiment, a target receiver of the first radio signal includes at least one of a terminal or a base station.

In one subembodiment, the terminal is a terminal used for terrestrial radio access.

In one embodiment, the frequency unit is a bandwidth occupied by one subcarrier.

In one embodiment, the first power is $P_{sRs,c}(i)$, the $P_{sRs,c}(i)$ is a transmit power used by the UE to transmits an SRS in an i-th subframe in a serving cell indexed with c, and the first radio signal is transmitted in the serving cell indexed with c. Specific definitions of the $P_{sRs,c}(i)$ can refer to TS36.213.

In one embodiment, the first power is $P_{SRS,c}(i)$, the $P_{SRS,c}(i)$ is a transmit power used by the UE to transmits an SRS in an i-th subframe in a serving cell indexed with c, and the first radio signal is transmitted in the serving cell indexed with c. Specific definitions of the $P_{SRS,c}(i)$ can refer to TS36.213.

In one embodiment, the first power is equal to a limit power.

In one embodiment, the limit power is $P_{cmAx,c}(i)$, the $P_{cmAx,c}(i)$ is a transmit power highest threshold configured by the UE in an i-th subframe in a serving cell indexed with c, and the first radio signal is transmitted in the serving cell indexed with c. Specific definitions of the $P_{cmAx,c}(i)$ can refer to TS36.213.

In one embodiment, the limit power is $P_{C\ MAX,c}(i)$, the $P_{C\ MAX,c}(i)$ is a transmit power highest threshold configured by the UE in an i-th subframe in a serving cell indexed with c, and the first radio signal is transmitted in the serving cell indexed with c. Specific definitions of the $P_{C\ MAX,c}(i)$ can refer to TS36.213.

In one embodiment, the limit power is configured through a higher-layer signaling.

In one embodiment, the limit power is cell specific.

In one embodiment, the limit power is UE specific.

In one embodiment, the W frequency units are consecutive in frequency domain.

In one embodiment, the W frequency units are not consecutive in frequency domain.

Specifically, according to one aspect of the disclosure, the method includes:

Step A0: receiving R first signaling(s).

Herein, the R first signaling(s) is(are) used for determining R first offset(s) respectively, a first reference power is in linear correlation with a summation of the R first offset(s), the first reference power is used for determining the first power, and the R is a positive integer.

In one embodiment, the R first signaling(s) schedule(s) one same carrier.

In one embodiment, any two of the R first signalings occupy orthogonal (non-overlapping) time domain resources.

In one embodiment, the first signaling is a physical layer signaling.

In one embodiment, the first signaling is a dynamic signaling.

In one embodiment, the first signaling is a dynamic signaling for uplink grant.

In one embodiment, the first signaling includes Downlink Control Information (DCI).

In one embodiment, the first signaling includes a DCI for uplink grant.

In one embodiment, the first signaling indicates the corresponding first offset.

In one embodiment, the first signaling includes a Transmitter Power Control (TPC) field.

In one embodiment, the first offset is indicated by a TPC filed in the corresponding first signaling.

In one embodiment, a target first signaling is a latest first signaling among the R first signaling(s), and the target first signaling is used for determining configuration information of the first radio signal. The configuration information includes at least one of occupied time-domain resources, occupied frequency-domain resources, occupied code-domain resources, a cyclic shift or a corresponding antenna port (corresponding antenna ports).

In one embodiment, the target first signaling is used for triggering transmission of the first radio signal.

In one embodiment, the first signaling is transmitted on a downlink physical layer control channel (that is, a downlink channel capable of carrying physical layer signalings only).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first power is a minimum one of the first reference power or the limit power.

In one embodiment, the first reference power is in unit of dBm.

In one embodiment, the first reference power is in linear correlation with a first component, and the first component is correlated with a trigger type of the first radio signal. A linear coefficient between the first reference power and the first component is 1.

In one subembodiment, the first component is $P_{SRS\_OFFSET,c}(m)$, the $P_{SRS\_OFFSET,c}(m)$ is transmit power offset of an SRS with a trigger type of m in a serving cell indexed with c relative to a Physical Uplink Shared Channel (PUSCH). The first radio signal is transmitted in the serving cell indexed with c. Specific definitions of the $P_{SRS\_OFFSET,c}(m)$ can refer to TS36.213.

In one subembodiment, the first component is configured through a higher-layer signaling.

In one subembodiment, the first component is configured semi-statically.

In one subembodiment, the first component is cell specific.

In one subembodiment, the first component is UE specific.

In one subembodiment, the trigger type includes 0 or 1.

In one embodiment, the first reference power is in linear correlation with a second component, and the second component is correlated with a schedule type of a PUSCH. A linear coefficient between the first reference power and the second component is 1.

In one subembodiment, the schedule type includes a semi-persistent grant, a dynamic scheduled grant or a random access response grant.

In one subembodiment, the second component is $P_{O\_PUSCH,c}(j)$. The $P_{O\_PUSCH,c}(j)$ is a transmit power baseline of a PUSCH correlated with a schedule type of j in a serving cell indexed with c, and the first radio signal is transmitted in the serving cell indexed with c. Specific definitions of the $P_{O\_PUSCH,c}(j)$ can refer to TS36.213.

In one subembodiment, the second component is configured through a higher-layer signaling.

In one subembodiment, the second component is cell specific.

In one subembodiment, the second component is UE specific.

In one embodiment, the first reference power is in liner correlation with a third component, and the third component is correlated with a quality of a channel from the UE to a target receiver of the first radio signal.

In one subembodiment, a linear coefficient between the first reference power and the third component is a non-negative real number less than or equal to 1.

In one subembodiment, a linear coefficient between the first reference power and the third component is $\alpha_c(j)$, the $\alpha_c(j)$ is a partial path loss compensation factor correlated with a schedule type of j in a serving cell indexed with c, and the first radio signal is transmitted in the serving cell indexed with c. Specific definitions of the $\alpha_c(j)$ can refer to TS36.213.

In one subembodiment, a linear coefficient between the first reference power and the third component is $\alpha_{SRS,c}$, the $\alpha_{SRS,c}$ is a partial path loss compensation factor for an SRS in a serving cell indexed with c, and the first radio signal is transmitted in the serving cell indexed with c. Specific definitions of the $\alpha_{SRS,c}$ can refer to TS36.213.

In one subembodiment, the linear coefficient between the first reference power and the third component is configured through a higher-layer signaling.

In one subembodiment, the linear coefficient between the first reference power and the third component is cell specific.

In one subembodiment, the linear coefficient between the first reference power and the third component is UE specific.

In one subembodiment, the third component is $PL_c$, the $PL_c$ is a path loss estimation value (in unit of dB) of the UE in a serving cell indexed with c, and the first radio signal is transmitted in the serving cell indexed with c. Specific definitions of the $PL_c$ can refer to TS36.213.

In one subembodiment, the third component is equal to a transmit power of a given reference signal minus a Reference Signal Received Power (RSRP) of the given reference signal measured by the UE, and a transmitter of the reference signal is a target receiver of the first radio signal.

In one embodiment, the first reference power is in linear correlation with a fourth component, and the fourth component is correlated with a trigger type of the first radio signal. A linear coefficient between the first reference power and the fourth component is 1.

In one subembodiment, the fourth component is $P_{O\_SRS,c}(m)$, the $P_{O\_SRS,c}(m)$ is a transmit power baseline of an SRS with a trigger type of m in a serving cell indexed with c, and the first radio signal is transmitted in the serving cell indexed with c. Specific definitions of the $P_{O\_SRS,c}(m)$ can refer to TS36.213.

In one subembodiment, the fourth component is configured through a higher-layer signaling.

In one subembodiment, the fourth component is cell specific.

In one subembodiment, the fourth component is UE specific.

In one embodiment, the first reference power is in linear correlation with a fifth component, and a summation of the R first offset(s) is used for determining the fifth component. A linear coefficient between the first reference power and the fifth component is 1.

In one subembodiment, the fifth component is in linear correlation with the summation of the R first offset(s), and a linear coefficient between the fifth component and the summation of the R first offset(s) is 1.

In one subembodiment, the fifth component is $f_c(i)$, the $f_c(i)$ is a state of power control adjustment on a PUSCH in an ith subframe in a serving cell indexed with c, and the first radio signal is transmitted in the serving cell indexed with c. Specific definitions of the $f_c(i)$ can refer to TS36.213.

In one subembodiment, the fifth component is $f_{SRS,c}(i)$, the $f_{SRS,c}(i)$ is a state of power control adjustment of an SRS in an ith subframe in a serving cell indexed with c, and the first radio signal is transmitted in the serving cell indexed with c. Specific definitions of the $f_{SRS,c}(i)$ can refer to TS36.213.

In one embodiment, the summation of the R first offset(s) is used for determining the $f_c(i)$.

In one embodiment, the $f_c(i)$ is equal to the summation of the R first offset(s).

In one embodiment, the summation of the R first offset(s) is used for determining the $f_{SRS,c}(i)$.

In one embodiment, the $f_{SRS,c}(i)$ is equal to the summation of the R first offset(s).

In one embodiment, a linear coefficient between the first reference power and the summation of the R first offset(s) is 1.

Specifically, according to one aspect of the disclosure, the method includes:

Step A1: receiving K second radio signal(s).

Herein, the K second radio signal(s) is(are) associated with K synchronization sequence(s) respectively, measurement(s) for the K second radio signal(s) is(are) used for determining a first path loss, the first path loss is used for determining the first power, and the K is a positive integer.

In one embodiment, the above method has the following benefits: the K second radio signal(s) is(are) transmitted by K different cell(s) or ground terminal(s) respectively, the above method ensures that, when the UE determines a transmit power, the UE not only considers the reception of an opposite-end ground user of the UE or the reception of a serving base station of the UE, but also considers interferences to neighbor cells or to ground users in neighbor cells. This method avoids the transmission of an air terminal interfering with the cells or ground terminals in multiple ground areas, thereby improving the efficiency of transmission and spectrum efficiency of the system.

In one embodiment, the K is equal to 1.

In one embodiment, the K is greater than 1.

In one embodiment, any two of the K synchronization sequences are different.

In one embodiment, the first reference power is in linear correlation with the first path loss.

In one embodiment, a linear coefficient between the first reference power and the first path loss is a non-negative real number less than or equal to 1.

In one embodiment, a linear coefficient between the first reference power and the first path loss is $\alpha_c(j)$, and specific definitions of the $\alpha_c(j)$ can refer to TS36.213.

In one embodiment, a linear coefficient between the first reference power and the first path loss is $\alpha_{SRS,c}$ and specific definitions of the $\alpha_{SRS,c}$ can refer to TS36.213.

In one embodiment, the third component is equal to the first path loss.

In one embodiment, the first path loss is $PL_c$, and specific definitions of the $PL_c$ can refer to TS36.213.

In one embodiment, the second radio signal includes at least one of a downlink reference signal, a synchronization signal or a downlink signaling.

In one embodiment, the downlink reference signal includes at least one of a Common Reference Signal (CRS), a Mobility Reference Signal (MRS), a Phase Tracking Reference Signal (PTRS), a Channel State Information-Reference Signal (CSI-RS), a DMRS, a Discovery Reference Signal (DRS) or a NarrowBand Reference Signal (NRS).

In one embodiment, the synchronization signal includes at least one of a Primary Synchronization Signal (PSS), a Secondary Synchronization Signal (SSS), a Master Information Block (MIB)/System Information Block (SIB), a Primary Sidelink Synchronization Signal (PSSS) or a Secondary Sidelink Synchronization Signal (SSSS).

In one embodiment, the downlink signaling is a physical layer signaling.

In one embodiment, the synchronization sequence includes at least one of a pseudorandom sequence or a Zadoff-Chu sequence.

In one embodiment, the synchronization sequence is used for determining a first-type identifier, and the first-type identifier is an integer.

In one subembodiment, the first-type identifier is a Physical Cell Identifier (PCI).

In one subembodiment, the first-type identifier corresponds to one cell uniquely.

In one subembodiment, the first-type identifier corresponds to one base station uniquely.

In one subembodiment, the first-type identifier corresponds to one Transmission Reception Point (TRP) uniquely.

In one embodiment, the K second radio signal(s) come(s) from K different node(s) respectively, and the node is one of a cell, a base station or a TRP.

In one embodiment, the first path loss is in unit of dB.

In one embodiment, measurement(s) for the K second radio signal(s) is(are) used for determining K reference path loss(es) respectively, and the K reference path loss(es) is(are) used for determining the first path loss.

In one embodiment, the reference path loss is in unit of dB.

In one embodiment, the reference path loss is equal to a transmit power of a corresponding second radio signal minus an RSRP of the corresponding second radio signal measured by the UE.

In one embodiment, the first path loss is a minimum one of the K reference path loss(es).

In one embodiment, the first path loss is a maximum one of the K reference path loss(es).

In one embodiment, the first path loss is an average of the K reference path loss(es).

In one embodiment, a linear value of the first path loss is an average of linear value(s) of the K reference path loss(es).

In one embodiment, a linear value of a given number is equal to the given value divided by 10 and then exponentiated by 10.

In one embodiment, the first path loss is in linear correlation with the K reference path losses respectively, the K reference path losses include at last two reference path losses, and linear coefficients between the two reference path losses and the first path loss are different.

In one embodiment, a linear value of the first path loss is in linear correlation with linear values of the K reference path losses respectively, the K reference path losses include at last two reference path losses, and linear coefficients between the linear values of the two reference path losses and the linear value of the first path loss are different.

Specifically, according to one aspect of the disclosure, the method includes:

Step A2: receiving downlink information.

Herein, the downlink information is used for determining configuration information of the first radio signal, and the configuration information includes at least one of occupied time-domain resources, occupied frequency-domain resources, occupied code-domain resources, a cyclic shift or a corresponding antenna port (corresponding antenna ports).

In one embodiment, a number of frequency units included in the occupied frequency-domain resources is the W.

In one embodiment, the downlink information is used for determining the W.

In one embodiment, the downlink information is carried by a higher-layer signaling.

In one embodiment, the downlink information is carried by a Radio Resource Control (RRC) signaling.

In one embodiment, the downlink information is carried by a Medium Access Control layer Control Element (MAC CE) signaling.

In one embodiment, the downlink information is carried by a physical layer signaling.

In one embodiment, the downlink information is configured semi-statically.

In one embodiment, the downlink information is UE specific.

In one embodiment, the downlink information is transmitted on a downlink physical layer data channel (that is, a downlink channel capable of carrying physical layer data).

In one subembodiment, the downlink physical layer data channel is a Physical Downlink Shared Channel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the downlink information is transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

Specifically, according to one aspect of the disclosure, the method includes:

Step A3: receiving a second signaling.

Herein, the second signaling is used for triggering transmission of the first radio signal.

In one embodiment, the second signaling is a higher-layer signaling.

In one embodiment, the second signaling is an MAC CE signaling.

In one embodiment, the second signaling is a physical layer signaling.

In one embodiment, the second signaling is a dynamic signaling.

In one embodiment, the second signaling is the target first signaling.

In one embodiment, the second signaling is used for determining the configuration information of the first radio signal.

In one embodiment, the downlink information is used for determining multiple pieces of configuration information, the configuration information of the first radio signal is one of the multiple pieces of configuration information, and the second signaling is used for determining the configuration information of the first radio signal from the multiple pieces of configuration information.

In one embodiment, the downlink information is used for determining multiple pieces of configuration information, the configuration information of the first radio signal is one of the multiple pieces of configuration information, and the target first signaling is used for determining the configuration information of the first radio signal from the multiple pieces of configuration information.

In one embodiment, the downlink information is used for determining one piece of configuration information.

In one embodiment, the downlink information is carried by the second signaling.

In one embodiment, the downlink information is carried by the target first signaling.

In one embodiment, the second signaling is transmitted on a downlink physical layer data channel (that is, a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the second signaling is transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

Specifically, according to one aspect of the disclosure, the first signaling includes a first field, value(s) of the first field(s) in the R first signaling(s) is(are) all equal to a first index, and the first index is an integer.

In one embodiment, the first index is an index of a target beamforming vector in Q1 beamforming vectors, the target beamforming vector is used for transmitting the first radio signal, and the Q1 is a positive integer greater than 1.

In one embodiment, the first index is an index of a target beamforming vector in Q1 beamforming vectors, the target beamforming vector is used for receiving the first radio signal, and the Q1 is a positive integer greater than 1.

In one embodiment, the first index is an index of a target beamforming vector group in Q2 beamforming vector groups, the beamforming vector group includes a positive integer number of beamforming vectors, a target beamforming vector is used for transmitting the first radio signal, and the target beamforming vector belongs to the target beamforming vector group. The Q2 is a positive integer greater than 1.

In one embodiment, the first index is an index of a target beamforming vector group in Q2 beamforming vector groups, the beamforming vector group includes a positive integer number of beamforming vectors, a target beamforming vector is used for receiving the first radio signal, and the target beamforming vector belongs to the target beamforming vector group. The Q2 is a positive integer greater than 1.

In one embodiment, the first index is an index of a target vector pair in Q3 vector pairs, the vector pair includes two vectors, and the target vector pair includes a target transmitting beamforming vector and a target receiving beamforming vector. The target transmitting beamforming vector is used for transmitting the first radio signal, and the target receiving beamforming vector is used for receiving the first radio signal. The Q3 is a positive integer greater than 1.

In one embodiment, the first index is an index of a target antenna group in Q4 antenna groups, and the antenna group includes a positive integer number of antennas. The target antenna group is used for transmitting the first radio signal. The Q4 is a positive integer greater than 1.

In one embodiment, the first index is an index of a target antenna group in Q4 antenna groups, and the antenna group includes a positive integer number of antennas. The target antenna group is used for receiving the first radio signal. The Q4 is a positive integer greater than 1.

In one embodiment, the first field includes 2 bits.

In one embodiment, the first field includes 3 bits.

In one embodiment, the first field includes 4 bits.

In one embodiment, the first field includes 5 bits.

In one embodiment, the first field includes 6 bits.

In one embodiment, the first index is a non-negative integer.

Specifically, according to one aspect of the disclosure, a first signature sequence is used for generating the first radio signal.

In one embodiment, the first radio signal is generated after the first signature sequence is processed in sequence through a modulation mapper, a layer mapper, precoding, a resource element mapper and wideband symbol generation.

In one embodiment, the first radio signal is generated after the first signature sequence is processed in sequence through a modulation mapper, a layer mapper, a transform precoder (used for generating complex-value signals), precoding, a resource element mapper and wideband symbol generation.

In one embodiment, the wideband symbol is an Orthogonal Frequency Division Multiplexing (OFDM) symbol.

In one embodiment, the wideband symbol is a Discrete Fourier Transform Spread OFDM (DFT-S-OFDM) symbol.

In one embodiment, the wideband symbol is a Filter Bank Multi Carrier (FBMC) symbol.

In one embodiment, the first signature sequence includes at least one of a pseudorandom sequence or a Zadoff-Chu sequence.

In one embodiment, a generation parameter of the first signature sequence is configured by a serving base station of the UE.

In one embodiment, the first signature sequence is generated after a first base sequence is processed through cyclic shift, and the cyclic shift corresponding to the first signature sequence is a first cyclic shift.

In one embodiment, the generation parameter of the first signature sequence includes an index of the first base sequence in N base sequences or the first cyclic shift, the base sequence includes at least one of a pseudorandom sequence or a Zadoff-Chu sequence, and the N is a positive integer greater than 1.

In one embodiment, the cyclic shift included in the configuration information of the first radio signal is the first cyclic shift.

In one embodiment, the downlink information is used for determining the first signature sequence.

In one embodiment, the target first information is used for determining the first signature sequence.

In one embodiment, the second information is used for determining the first signature sequence.

The disclosure provides a method in a base station for wireless communication, wherein the method includes:

Step A: receiving a first radio signal.

Herein, the first radio signal occupies W frequency unit(s) in frequency domain, a transmit power of the first radio signal is a first power, the first power is uncorrelated with the W, the W is a positive integer, and the W is configurable.

In one embodiment, the W is configured dynamically.

In one embodiment, the W is configured semi-statically.

In one embodiment, the first radio signal includes an uplink reference signal.

In one embodiment, the first radio signal includes an SRS.

In one embodiment, the first radio signal includes an uplink DMRS.

Specifically, according to one aspect of the disclosure, the method includes:

Step A0: transmitting R first signaling(s).

Herein, the R first signaling(s) is(are) used for determining R first offset(s) respectively, a first reference power is in linear correlation with a summation of the R first offset(s), the first reference power is used for determining the first power, and the R is a positive integer.

In one embodiment, the first signaling is a dynamic signaling.

In one embodiment, the first signaling is a dynamic signaling for uplink grant.

In one embodiment, the first signaling includes a TPC field.

In one embodiment, the first offset is indicated by a TPC filed in the corresponding first signaling.

In one embodiment, a linear coefficient between the first reference power and the summation of the R first offset(s) is 1.

Specifically, according to one aspect of the disclosure, the method includes:

Step A1: transmitting a target second radio signal.

Herein, K second radio signal(s) is(are) associated with K synchronization sequence(s) respectively, measurement(s) for the K second radio signal(s) is(are) used for determining a first path loss, the first path loss is used for determining the first power, the target second radio signal is one of the K second radio signal(s), and the K is a positive integer.

In one embodiment, the K is equal to 1.

In one embodiment, the K is greater than 1.

In one embodiment, only the target second radio signal among the K second radio signal(s) is transmitted by a transmitter of the target second radio signal.

In one embodiment, the first reference power is in linear correlation with the first path loss.

Specifically, according to one aspect of the disclosure, the method includes:

Step A2: transmitting downlink information.

Herein, the downlink information is used for determining configuration information of the first radio signal, and the configuration information includes at least one of occupied time-domain resources, occupied frequency-domain resources, occupied code-domain resources, a cyclic shift or a corresponding antenna port (corresponding antenna ports);

In one embodiment, a number of frequency units included in the occupied frequency-domain resources is the W.

In one embodiment, the downlink information is used for determining the W.

Specifically, according to one aspect of the disclosure, the method includes:

Step A3: transmitting a second signaling.

Herein, the second signaling is used for triggering transmission of the first radio signal.

Specifically, according to one aspect of the disclosure, the first signaling includes a first field, value(s) of the first field(s) in the R first signaling(s) is(are) all equal to a first index, and the first index is an integer.

Specifically, according to one aspect of the disclosure, a first signature sequence is used for generating the first radio signal.

In one embodiment, a generation parameter of the first signature sequence is configured by the base station.

The disclosure provides a UE for wireless communication, wherein the UE includes:

a first processor, to transmit a first radio signal.

Herein, the first radio signal occupies W frequency unit(s) in frequency domain, a transmit power of the first radio signal is a first power, the first power is uncorrelated with the W, the W is a positive integer, and the W is configurable.

In one embodiment, the above UE for wireless communication is characterized in that: the first processor further receives R first signaling(s), wherein the R first signaling(s) is(are) used for determining R first offset(s) respectively, a first reference power is in linear correlation with a summation of the R first offset(s), the first reference power is used for determining the first power, and the R is a positive integer.

In one embodiment, the above UE for wireless communication is characterized in that: the first processor receives K second radio signal(s), wherein the K second radio signal(s) is(are) associated with K synchronization sequence(s) respectively, measurement(s) for the K second radio signal(s) is(are) used for determining a first path loss, the first path loss is used for determining the first power, and the K is a positive integer.

In one embodiment, the above UE for wireless communication is characterized in that: the first processor receives downlink information, wherein the downlink information is used for determining configuration information of the first radio signal, and the configuration information includes at least one of occupied time-domain resources, occupied frequency-domain resources, occupied code-domain resources, a cyclic shift or a corresponding antenna port (corresponding antenna ports).

In one embodiment, the above UE for wireless communication is characterized in that: the first processor further receives a second signaling, wherein the second signaling is used for triggering transmission of the first radio signal.

In one embodiment, the above UE for wireless communication is characterized in that: the first signaling includes a first field, value(s) of the first field(s) in the R first signaling(s) is(are) all equal to a first index, and the first index is an integer.

In one embodiment, the above UE for wireless communication is characterized in that: a first signature sequence is used for generating the first radio signal.

The disclosure provides a base station for wireless communication, wherein the base station includes:

a second processor, to receive a first radio signal.

Herein, the first radio signal occupies W frequency unit(s) in frequency domain, a transmit power of the first radio signal is a first power, the first power is uncorrelated with the W, the W is a positive integer, and the W is configurable.

In one embodiment, the above base station for wireless communication is characterized in that: the second processor further transmits R first signaling(s), wherein the R first signaling(s) is(are) used for determining R first offset(s) respectively, a first reference power is in linear correlation with a summation of the R first offset(s), the first reference power is used for determining the first power, the R is a positive integer In one embodiment, the above base station for wireless communication is characterized in that: the second processor further transmits a target second radio signal, wherein K second radio signal(s) is(are) associated with K synchronization sequence(s) respectively, measurement(s) for the K second radio signal(s) is(are) used for determining a first path loss, the first path loss is used for determining the first power, the target second radio signal is one of the K second radio signal(s), and the K is a positive integer.

In one embodiment, the above base station for wireless communication is characterized in that: the second processor further transmits downlink information, wherein the downlink information is used for determining configuration information of the first radio signal, and the configuration information includes at least one of occupied time-domain resources, occupied frequency-domain resources, occupied code-domain resources, a cyclic shift or a corresponding antenna port (corresponding antenna ports).

In one embodiment, the above base station for wireless communication is characterized in that: the second processor further transmits a second signaling, wherein the second signaling is used for triggering transmission of the first radio signal.

In one embodiment, the above base station for wireless communication is characterized in that: the first signaling includes a first field, value(s) of the first field(s) in the R first signaling(s) is(are) all equal to a first index, and the first index is an integer.

In one embodiment, the above base station for wireless communication is characterized in that: a first signature sequence is used for generating the first radio signal.

In one embodiment, compared with conventional schemes, the disclosure has the following benefits:

In existing LTE systems, a transmit power of a bandwidth variable radio signal is correlated with a bandwidth occupied by the radio signal. In the case of not exceeding a maximum transmit power, the wider the occupied bandwidth, the bigger the transmit power of the radio signal. For air communication, this power control technology cannot well utilize the feature that a channel between an air terminal and a ground terminal/base station is an LOS.

Since the channel of LOS basically has no frequency selective fading, it is only needed to estimate one channel fading coefficient on the entire frequency band; therefore, the transmit power of the reference signal does not need to change with the occupied bandwidth. The method in the disclosure disassociates the transmit power of the reference signal from the bandwidth occupied by the reference signal, thereby reducing the power consumption of the air terminal while ensuring a channel estimated quality, and reducing interferences to neighbor cells or to ground users in neighbor cells.

BRIEF DESCRIPTION OF THE DRAWINGS

Other features, purposes and advantages of the disclosure will become more apparent from the detailed description of non-restrictive embodiments taken in conjunction with the following drawings.

FIG. 4 is a diagram illustrating a constituting component of a first power according to another embodiment of the disclosure.

DESCRIPTION OF THE EMBODIMENTS

Embodiment 1

Figure 1:
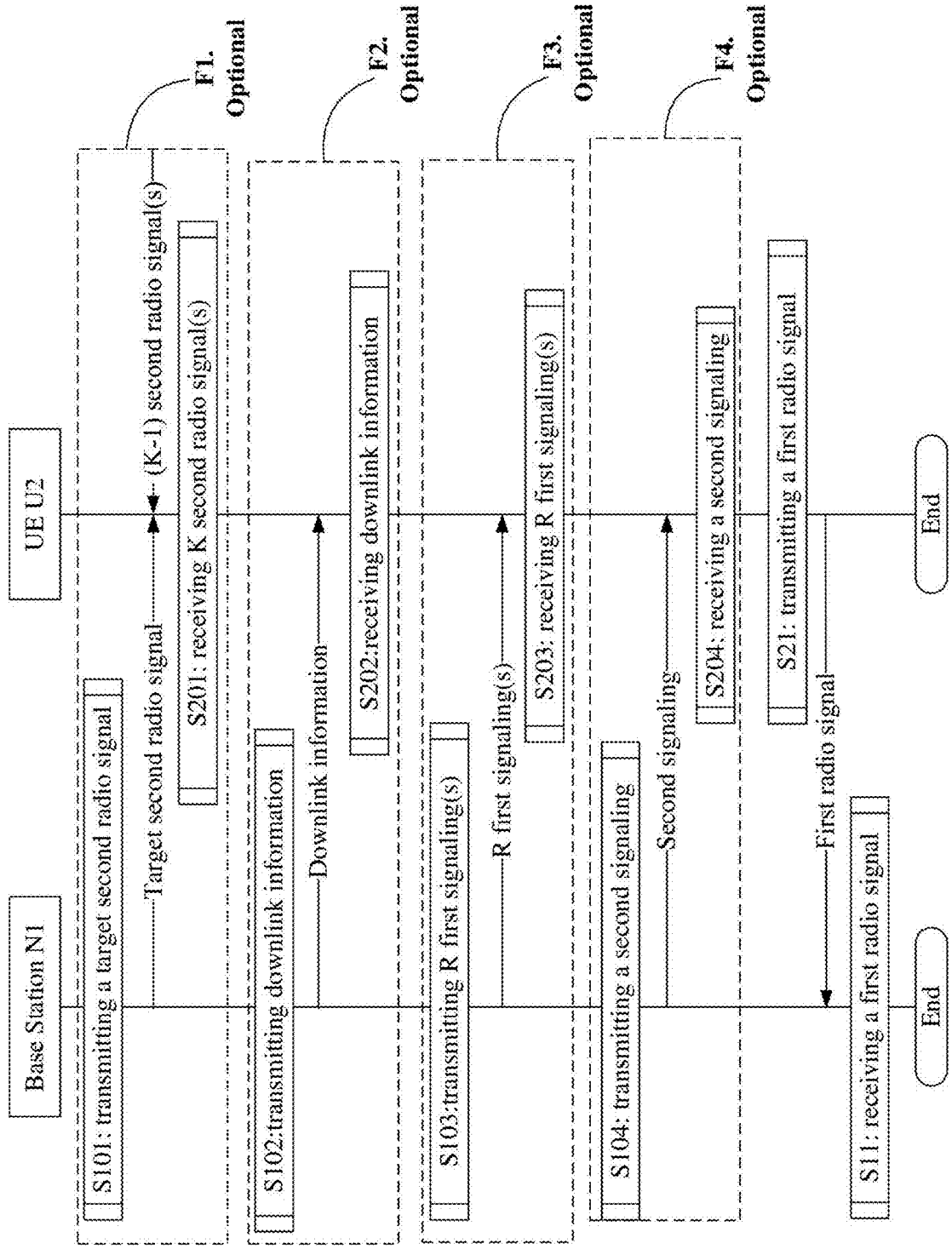
FIG. 1 is a flowchart of wireless transmission according to one embodiment of the disclosure.

Embodiment 1 illustrates an example of a flowchart of wireless transmission, as shown in FIG. 1. In FIG. 1, a base station N1 is a maintenance base station for a serving cell of a UE U2. In FIG. 1, steps in boxes F1, F2, F3 and F4 are optional respectively.

The N1 transmits a target second radio signal in S101, transmits downlink information in S102, transmits R first signaling(s) in S103, transmits a second signaling in S104 and receives a first radio signal in S11.

The U2 receives K second radio signal(s) in S201, receives downlink information in S202, receives R first signaling(s) in S203, receives a second signaling in S204 and transmits a first radio signal in S21.

In Embodiment 1, the first radio signal occupies W frequency unit(s) in frequency domain, a transmit power of the first radio signal is a first power, the first power is uncorrelated with the W, the W is a positive integer, and the W is configurable. The R first signaling(s) is(are) used by the U2 to determine R first offset(s) respectively, a first reference power is in linear correlation with a summation of the R first offset(s), the first reference power is used by the U2 to determine the first power, and the R is a positive integer. The K second radio signal(s) is(are) associated with K synchronization sequence(s) respectively, the target second radio signal is one of the K second radio signal(s), measurement(s) for the K second radio signal(s) is(are) used by the U2 to determine a first path loss, the first path loss is used by the U2 to determine the first power, and the K is a positive integer. The downlink information is used by the U2 to determine configuration information of the first radio signal, and the configuration information includes at least one of occupied time-domain resources, occupied frequency-domain resources, occupied code-domain resources, a cyclic shift or a corresponding antenna port (corresponding antenna ports). The second signaling is used for triggering transmission of the first radio signal.

In one embodiment, the K second radio signal(s) include(s) the (K−1) second radio signal(s) and the target second radio signal shown in FIG. 1.

In one embodiment, the W is configured dynamically.

In one embodiment, the W is configured semi-statically.

In one embodiment, the W is configured through a higher-layer signaling.

In one embodiment, the W is configured through a physical layer signaling.

In one embodiment, the W is configured through the downlink information.

In one embodiment, a target receiver of the first radio signal includes at least one of a terminal or a base station.

In one subembodiment, the terminal is a terminal used for terrestrial radio access.

In one embodiment, the frequency unit is a bandwidth occupied by one subcarrier.

In one embodiment, the first power is in unit of dBm.

In one embodiment, the first power is $P_{SRS,c}(i)$, the $P_{SRS,c}(i)$ is a transmit power used by the U2 to transmits an SRS in an ith subframe in a serving cell indexed with c, and the first radio signal is transmitted in the serving cell indexed with c. Specific definitions of the $P_{SRS,c}(i)$ can refer to TS36.213.

In one embodiment, the first power is equal to a limit power.

In one embodiment, the first power is less than a limit power.

In one embodiment, the limit power is $P_{C\ MAX,c}(i)$, the $P_{C\ MAX,c}(i)$ is a transmit power highest threshold configured by the U2 in an ith subframe in a serving cell indexed with c, and the first radio signal is transmitted in the serving cell indexed with c. Specific definitions of the $P_{C\ MAX,c}(i)$ can refer to TS36.213.

In one embodiment, the R first signaling(s) schedule(s) one same carrier.

In one embodiment, any two of the R first signalings occupy orthogonal (non-overlapping) time domain resources.

In one embodiment, the first signaling is a physical layer signaling.

In one embodiment, the first signaling is a dynamic signaling.

In one embodiment, the first signaling is a dynamic signaling for uplink grant.

In one embodiment, the first signaling indicates the corresponding first offset.

In one embodiment, the first signaling includes a TPC field.

In one embodiment, the first offset is indicated by a TPC filed in the corresponding first signaling.

In one embodiment, a target first signaling is a latest first signaling among the R first signaling(s), and the target first signaling is used by the U2 to determine configuration information of the first radio signal. The configuration information includes at least one of occupied time-domain resources, occupied frequency-domain resources, occupied code-domain resources, a cyclic shift or a corresponding antenna port (corresponding antenna ports).

In one embodiment, the downlink information is carried by the target first signaling.

In one embodiment, the first power is a minimum one of the first reference power or the limit power.

In one embodiment, a linear coefficient between the first reference power and the summation of the R first offset(s) is 1.

In one embodiment, the K is equal to 1.

In one embodiment, the K is greater than 1.

In one embodiment, any two of the K synchronization sequences are different.

In one embodiment, only the target second radio signal among the K second radio signal(s) is transmitted by the N1.

In one embodiment, the first reference power is in linear correlation with the first path loss.

In one embodiment, a linear coefficient between the first reference power and the first path loss is a non-negative real number less than or equal to 1.

In one embodiment, the second radio signal includes at least one of a downlink reference signal, a synchronization signal or a downlink signaling.

In one embodiment, the downlink reference signal includes at least one of a CRS, an MRS, a PTRS, a CSI-RS, a DMRS, a DRS or an NRS.

In one embodiment, the synchronization signal includes at least one of a PSS, an SSS, an MIB/SIB, a PSSS, an SSSS.

In one embodiment, the downlink signaling is a physical layer signaling.

In one embodiment, the synchronization sequence includes at least one of a pseudorandom sequence or a Zadoff-Chu sequence.

In one embodiment, the synchronization sequence is used by the U2 to determine a first-type identifier, and the first-type identifier is an integer.

In one subembodiment, the first-type identifier is a PCI.

In one subembodiment, the first-type identifier corresponds to one cell uniquely.

In one subembodiment, the first-type identifier corresponds to one base station uniquely.

In one subembodiment, the first-type identifier corresponds to one TRP uniquely.

In one embodiment, the K second radio signal(s) come(s) from K different node(s) respectively, and the node is one of a cell, a base station or a TRP.

In one embodiment, the first path loss is in unit of dB.

In one embodiment, measurement(s) for the K second radio signal(s) is(are) used by the U2 to determine K reference path loss(es) respectively, and the K reference path loss(es) is(are) used by the U2 to determine the first path loss.

In one embodiment, the number of frequency units included in the occupied frequency-domain resources included in the configuration information of the first radio signal is the W.

In one embodiment, the downlink information is carried by a higher-layer signaling.

In one embodiment, the downlink information is carried by an RRC signaling.

In one embodiment, the downlink information is carried by an MAC CE signaling.

In one embodiment, the downlink information is carried by a physical layer signaling.

In one embodiment, the downlink information is configured semi-statically.

In one embodiment, the downlink information is UE specific.

In one embodiment, the second signaling is a higher-layer signaling.

In one embodiment, the second signaling is an MAC CE signaling.

In one embodiment, the second signaling is a physical layer signaling.

In one embodiment, the second signaling is a dynamic signaling.

In one embodiment, the second signaling is the target first signaling.

In one embodiment, the second signaling is used by the U2 to determine the configuration information of the first radio signal.

In one embodiment, the downlink information is used by the U2 to determine multiple pieces of configuration information, the configuration information of the first radio signal is one of the multiple pieces of configuration information, and the second signaling is used by the U2 to determine the configuration information of the first radio signal from the multiple pieces of configuration information.

In one embodiment, the downlink information is used by the U2 to determine multiple pieces of configuration information, the configuration information of the first radio signal is one of the multiple pieces of configuration information, and the target first signaling is used by the U2 to determine the configuration information of the first radio signal from the multiple pieces of configuration information.

In one embodiment, the downlink information is used by the U2 to determine one piece of configuration information.

In one embodiment, the downlink information is carried by the second signaling.

In one embodiment, the first signaling includes a first field, value(s) of the first field(s) in the R first signaling(s) is(are) all equal to a first index, and the first index is an integer.

In one embodiment, the first index is a non-negative integer.

In one embodiment, a first signature sequence is used by the U2 to generate the first radio signal.

In one embodiment, the first radio signal is generated after the first signature sequence is processed in sequence through a modulation mapper, a layer mapper, precoding, a resource element mapper and wideband symbol generation.

In one embodiment, the first radio signal is generated after the first signature sequence is processed in sequence through a modulation mapper, a layer mapper, a transform precoder (used for generating complex-value signals), precoding, a resource element mapper and wideband symbol generation.

In one embodiment, the wideband symbol is an OFDM symbol.

In one embodiment, the wideband symbol is a DFT-S-OFDM symbol.

In one embodiment, the wideband symbol is an FBMC symbol.

In one embodiment, the first signature sequence includes at least one of a pseudorandom sequence or a Zadoff-Chu sequence.

In one embodiment, a generation parameter of the first signature sequence is configured by the N1.

In one embodiment, the first signature sequence is generated after a first base sequence is processed through cyclic shift, and the cyclic shift corresponding to the first signature sequence is a first cyclic shift.

In one embodiment, the generation parameter of the first signature sequence includes an index of the first base sequence in N base sequences or the first cyclic shift, the base sequence includes at least one of a pseudorandom sequence or a Zadoff-Chu sequence, and the N is a positive integer greater than 1.

In one embodiment, the cyclic shift included in the configuration information of the first radio signal is the first cyclic shift.

In one embodiment, the downlink information is used by the U2 to determine the first signature sequence.

In one embodiment, the target first information is used by the U2 to determine the first signature sequence.

In one embodiment, the second information is used by the U2 to determine the first signature sequence.

In one embodiment, boxes F1, F2 and F3 in FIG. 1 exist, and box F4 does not exist.

In one subembodiment, the target first signaling is used for triggering transmission of the first radio signal.

In one embodiment, boxes F1, F3 and F4 in FIG. 1 exist, and box F2 does not exist.

In one subembodiment, the downlink information is carried by the second signaling.

In one subembodiment, the second signaling indicates the configuration information of the first radio signal.

In one embodiment, boxes F1 and F3 in FIG. 1 exist, and boxes F2 and F4 do not exist.

In one subembodiment, the target first signaling is used for triggering transmission of the first radio signal.

In one subembodiment, the downlink information is carried by the target first signaling.

In one subembodiment, the target first signaling indicates configuration information of the first radio signal.

In one embodiment, boxes F1, F2, F3 and F4 shown in FIG. 1 all exist.

In one embodiment, none of boxes F1, F2, F3 and F4 shown in FIG. 1 exist.

Embodiment 2

Figure 2:
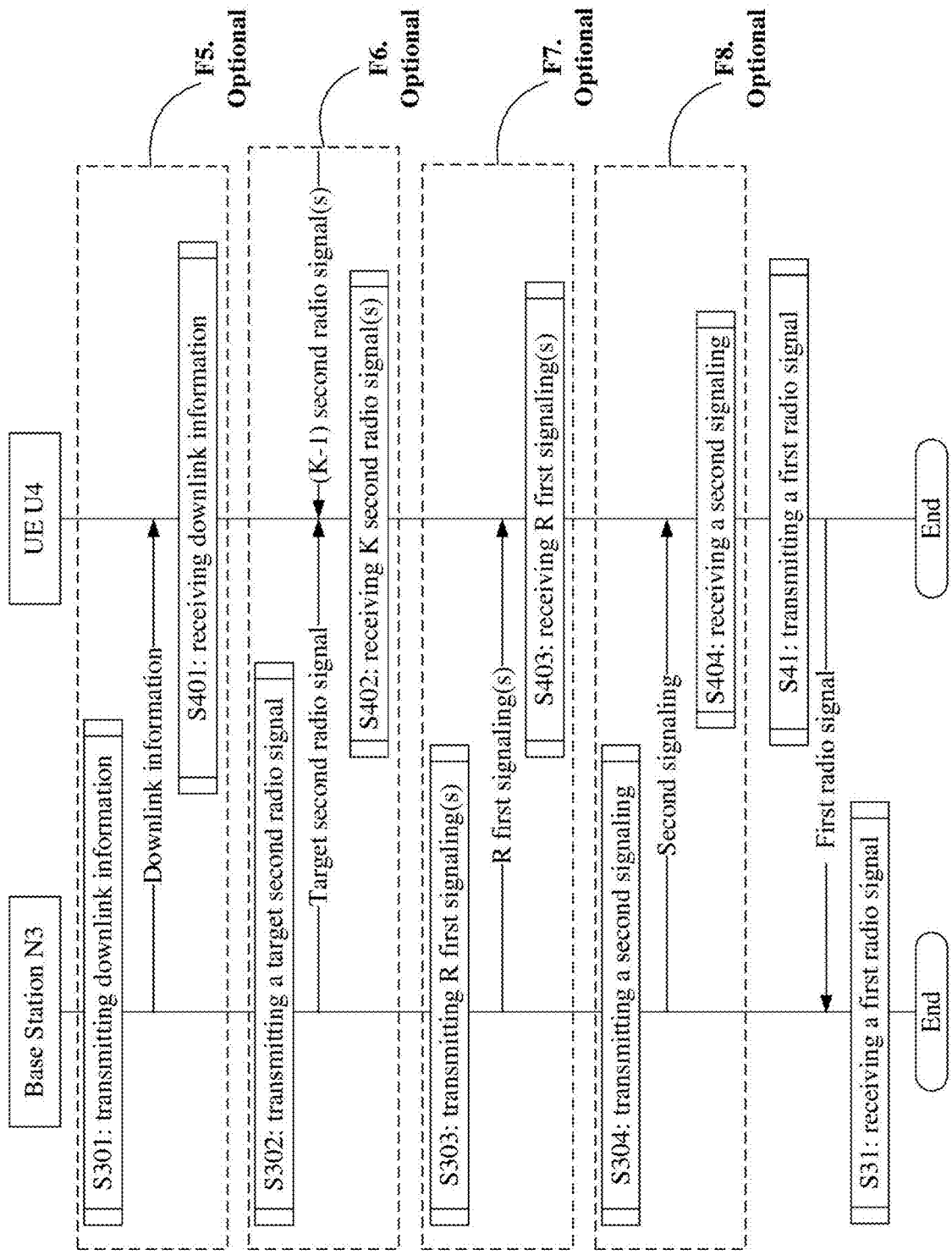
FIG. 2 is a flowchart of wireless transmission according to another embodiment of the disclosure.

Embodiment 2 illustrates an example of a flowchart of wireless transmission, as shown in FIG. 2. In FIG. 2, a base station N3 is a maintenance base station for a serving cell of a UE U4. In FIG. 2, steps in boxes F5, F6, F7 and F8 are optional respectively.

The N3 transmits downlink information in S301, transmits a target second radio signal in S302, transmits R first signaling(s) in S303, transmits a second signaling in S304 and receives a first radio signal in S31.

The U4 receives downlink information in S401, receives K second radio signal(s) in S402, receives R first signaling(s) in S403, receives a second signaling in S404 and transmits a first radio signal in S41.

In Embodiment 2, the first radio signal occupies W frequency unit(s) in frequency domain, a transmit power of the first radio signal is a first power, the first power is uncorrelated with the W, the W is a positive integer, and the W is configurable. The R first signaling(s) is(are) used by the U4 to determine R first offset(s) respectively, a first reference power is in linear correlation with a summation of the R first offset(s), the first reference power is used by the U4 to determine the first power, and the R is a positive integer. The K second radio signal(s) is(are) associated with K synchronization sequence(s) respectively, the target second radio signal is one of the K second radio signal(s), measurement(s) for the K second radio signal(s) is(are) used by the U4 to determine a first path loss, the first path loss is used by the U4 to determine the first power, and the K is a positive integer. The downlink information is used by the U4 to determine configuration information of the first radio signal, and the configuration information includes at least one of occupied time-domain resources, occupied frequency-domain resources, occupied code-domain resources, a cyclic shift or a corresponding antenna port (corresponding antenna ports). The second signaling is used for triggering transmission of the first radio signal.

In one embodiment, the K second radio signal(s) include(s) the (K−1) second radio signal(s) and the target second radio signal shown in FIG. 2.

In one embodiment, boxes F5, F6 and F7 in FIG. 2 exist, and box F8 does not exist.

In one embodiment, boxes F5, F7 and F8 in FIG. 2 exist, and box F6 does not exist.

In one embodiment, boxes F5 and F7 in FIG. 2 exist, and boxes F6 and F8 do not exist.

In one embodiment, boxes F5, F6, F7 and F8 in FIG. 2 all exist.

In one embodiment, none of boxes F5, F6, F7 and F8 in FIG. 2 exist.

Embodiment 3

Figure 3:
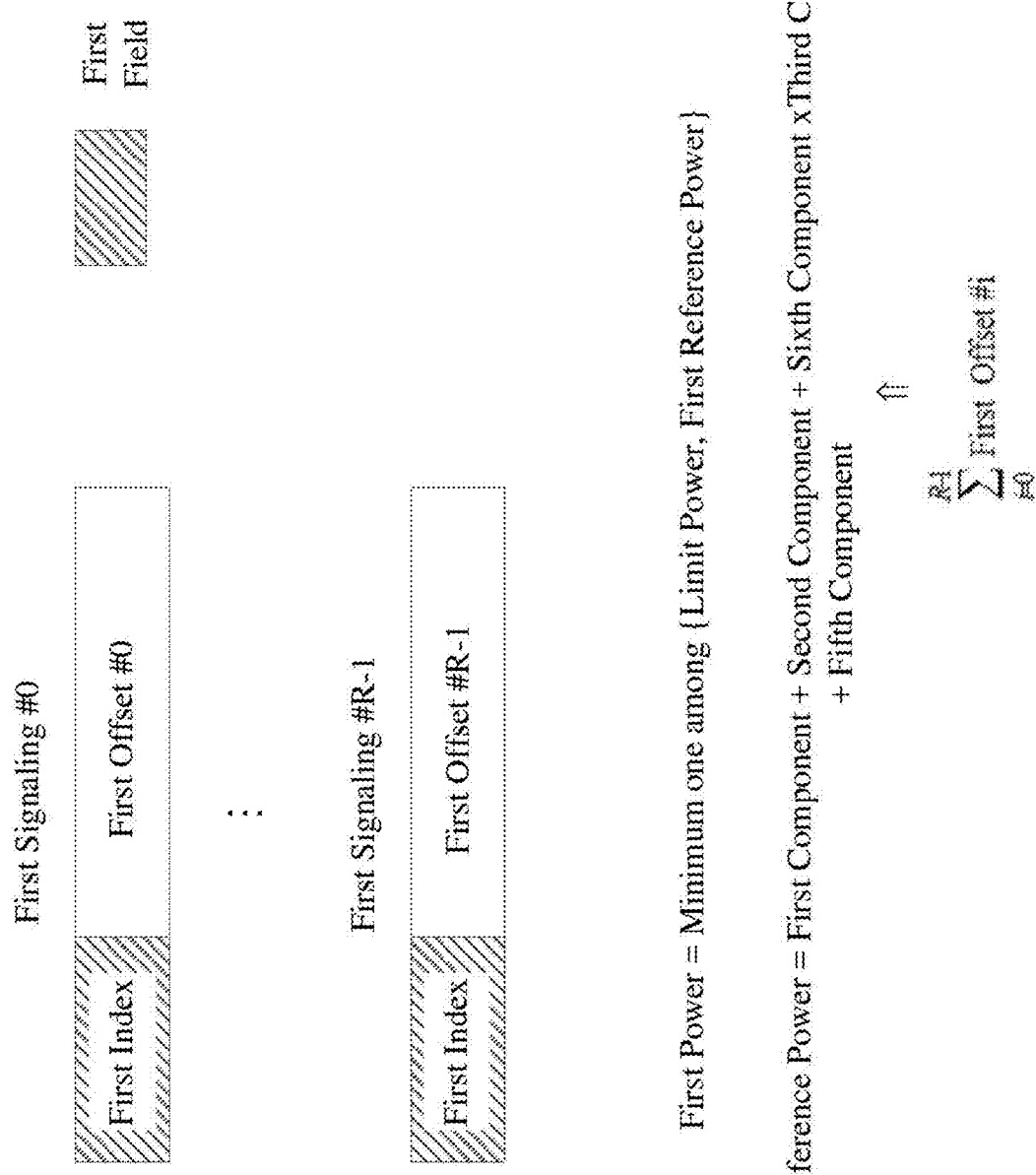
FIG. 3 is a diagram illustrating a constituting component of a first power according to one embodiment of the disclosure.

Embodiment 3 illustrates an example of a diagram of a constituting component of a first power, as shown in FIG. 3.

In Embodiment 3, the first power is a minimum one of a first reference power or a limit power. The first reference power is in linear correlation with a summation of R first offsets, R first signalings are used for determining the R first offsets respectively. The first signaling includes a first field, values of the first fields in the R first signaling are all equal to a first index, the first index is an integer, and the R is positive integer. The first reference power is in linear correlation with a first component, a second component, a third component or a fifth component respectively. A linear coefficient between the first reference power and the first component, the second component or the fifth component is 1 respectively, and a linear coefficient between the first reference power and the third component is a sixth component. The fifth component is a summation of the R first offsets, that is:

$$P_{SRS,c}(i) = \min \left\{ \begin{array}{l} P_{CMAX,c}(i), \\ P_{SRS\_OFFSET,c}(m) + P_{O\_PUSCH,c}(j) + \\ \alpha_c(j) \cdot PL_c + f_c(i) \end{array} \right\}$$

where the $P_{SRS,c}(i)$, the $P_{C\_MAX,c}(i)$, the $P_{SRS\_OFFSET,c}(m)$, the $P_{O\_PUSCH,c}(j)$, the $\alpha_c(j)$, the $PL_c$ and the $f_c(i)$ represent the first power, the limit power, the first component, the second component, the sixth component, the third component and the fifth component respectively. Specific definitions of the $P_{SRS,c}(i)$, the $P_{C\_MAX,c}(i)$, the $P_{SRS\_OFFSET,c}(m)$, the $P_{O\_PUSCH,c}(j)$, the $\alpha_c(j)$, the $PL_c$ and the $f_c(i)$ can refer to TS36.213.

In one embodiment, the first signaling includes a TPC field.

In one embodiment, the first offset is indicated by a TPC filed in the corresponding first signaling.

In one embodiment, the limit power is configured through a higher-layer signaling.

In one embodiment, the limit power is cell specific.

In one embodiment, the limit power is UE specific.

In one embodiment, the first component is configured through a higher-layer signaling.

In one embodiment, the first component is configured semi-statically.

In one embodiment, the first component is cell specific.

In one embodiment, the first component is UE specific.

In one embodiment, the second component is configured through a higher-layer signaling.

In one embodiment, the second component is cell specific.

In one embodiment, the second component is UE specific.

In one embodiment, the sixth component is configured through a higher-layer signaling.

In one embodiment, the sixth component is cell specific.

In one embodiment, the sixth component is UE specific.

In one embodiment, the third component is equal to the first path loss in the disclosure.

In one embodiment, the first index is a non-negative integer.

In one embodiment, the first index is an index of a target beamforming vector in Q1 beamforming vectors, the target beamforming vector is used for transmitting the first radio signal, and the Q1 is a positive integer greater than 1.

In one embodiment, the first index is an index of a target beamforming vector in Q1 beamforming vectors, the target beamforming vector is used for receiving the first radio signal, and the Q1 is a positive integer greater than 1.

In one embodiment, the first index is an index of a target beamforming vector group in Q2 beamforming vector groups, the beamforming vector group includes a positive integer number of beamforming vectors, a target beamforming vector is used for transmitting the first radio signal, and the target beamforming vector belongs to the target beamforming vector group. The Q2 is a positive integer greater than 1.

In one embodiment, the first index is an index of a target beamforming vector group in Q2 beamforming vector groups, the beamforming vector group includes a positive integer number of beamforming vectors, a target beamforming vector is used for receiving the first radio signal, and the target beamforming vector belongs to the target beamforming vector group. The Q2 is a positive integer greater than 1.

In one embodiment, the first index is an index of a target vector pair in Q3 vector pairs, the vector pair includes two vectors, and the target vector pair includes a target transmitting beamforming vector and a target receiving beamforming vector. The target transmitting beamforming vector is used for transmitting the first radio signal, and the target receiving beamforming vector is used for receiving the first radio signal. The Q3 is a positive integer greater than 1.

In one embodiment, the first index is an index of a target antenna group in Q4 antenna groups, and the antenna group includes a positive integer number of antennas. The target antenna group is used for transmitting the first radio signal. The Q4 is a positive integer greater than 1.

In one embodiment, the first index is an index of a target antenna group in Q4 antenna groups, and the antenna group includes a positive integer number of antennas. The target antenna group is used for receiving the first radio signal. The Q4 is a positive integer greater than 1.

In one embodiment, the first field includes 2 bits.
In one embodiment, the first field includes 3 bits.
In one embodiment, the first field includes 4 bits.
In one embodiment, the first field includes 5 bits.
In one embodiment, the first field includes 6 bits.

Embodiment 4

Embodiment 4 illustrates an example of a diagram of a constituting component of a first power, as shown in FIG. 4.

In Embodiment 4, the first power is a minimum one of a first reference power or a limit power. The first reference power is in linear correlation with a summation of R first offsets, R first signalings are used for determining the R first offsets respectively. The first signaling includes a first field, values of the first fields in the R first signaling are all equal to a first index, the first index is an integer, and the R is positive integer. The first reference power is in linear correlation with a third component, a fourth component or a fifth component respectively. A linear coefficient between the first reference power and the fourth component or the fifth component is 1 respectively, and a linear coefficient between the first reference power and the third component is a seventh component. The fifth component is a summation of the R first offsets, that is:

$$P_{SRS,c}(i)=\min\{P_{C\,MAX,c}(i),P_{O\_SRS,c}(m)+\alpha_{SRS,c}\cdot PL_c+f_{SRS,c}(i)\}[dNm]$$

where the $P_{SRS,c}(i)$, the $P_{C\,MAX,c}(i)$, the $P_{O\_SRS,c}(m)$, the $\alpha_{SRS,c}$, the $PL_c$, and the $f_{SRS,c}(i)$ represent the first power, the limit power, the fourth component, the seventh component, the third component and the fifth component respectively. Specific definitions of the $P_{SRS,c}(i)$, the $P_{C\,MAX,c}(i)$, the $P_{O\_SRS,c}(m)$, the $\alpha_{SRS,c}$, the $PL_c$, and the $f_{SRS,c}(i)$ can refer to TS36.213.

In one embodiment, the fourth component is configured through a higher-layer signaling.

In one embodiment, the fourth component is cell specific.
In one embodiment, the fourth component is UE specific.

Embodiment 5

Figure 5:
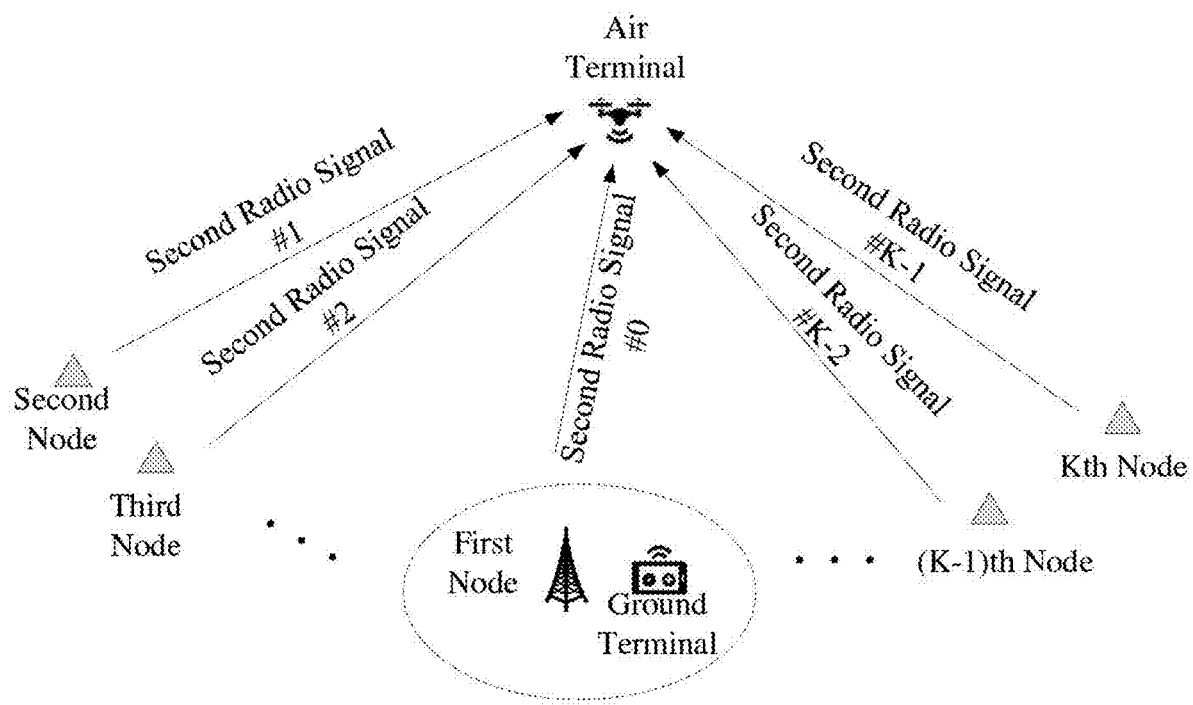
FIG. 5 is a diagram illustrating a case of determining a first path loss according to K second radio signals according to one embodiment of the disclosure.

Embodiment 5 illustrates an example of a diagram of a case of determining a first path loss according to K second radio signals, as shown in FIG. 5.

In Embodiment 5, the K second radio signals are associated with K synchronization sequences respectively, measurements for the K second radio signals are used for determining K reference path losses respectively, the K reference path losses are used for determining the first path loss, and the K is a positive integer. The K second radio signals come from K different nodes, and the node is one of a cell, a base station or a TRP. In FIG. 5, indexes of the K second radio signals are #0, #1, #2, ..., #K−1 respectively. The second radio signal #0 is the target second radio signal in the disclosure.

In FIG. 5, the air terminal corresponds to the UE in the disclosure, the first node corresponds to the transmitter of the target second radio signal in the disclosure, the ground terminal is an opposite-end terminal of the air terminal, and the ground terminal performs Device to Device (D2D) communication with the air terminal. In FIG. 5, the second node, the third node to the Kth node correspond to transmitters of (K−1) second radio signals among the K second radio signals other than the target second radio signal respectively.

In one embodiment, the K is equal to 1.
In one embodiment, the K is greater than 1.
In one embodiment, the first path loss is in unit of dB.
In one embodiment, the reference path loss is in unit of dB.

In one embodiment, the reference path loss is equal to a transmit power of a corresponding second radio signal minus an RSRP of the corresponding second radio signal measured by the air terminal in FIG. 5.

In one embodiment, the first path loss is a minimum one of the K reference path loss(es).

In one embodiment, the first path loss is a maximum one of the K reference path loss(es).

In one embodiment, the first path loss is an average of the K reference path loss(es).

In one embodiment, a linear value of the first path loss is an average of linear value(s) of the K reference path loss(es).

In one embodiment, a linear value of a given number is equal to the given value divided by 10 and then exponentiated by 10.

In one embodiment, the first path loss is in linear correlation with the K reference path losses respectively, the K reference path losses include at last two reference path losses, and linear coefficients between the two reference path losses and the first path loss are different.

In one embodiment, a linear value of the first path loss is in linear correlation with linear values of the K reference path losses respectively, the K reference path losses include at last two reference path losses, and linear coefficients between the linear values of the two reference path losses and the linear value of the first path loss are different.

In one embodiment, the first path loss is used for determining the first power in the disclosure.

In one embodiment, the first path loss is used for determining the first reference power in the disclosure.

In one embodiment, the first reference power is in linear correlation with the first path loss.

In one embodiment, a linear coefficient between the first reference power and the first path loss is a non-negative real number less than or equal to 1.

In one embodiment, a linear coefficient between the first reference power and the first path loss is $\alpha_c(j)$, and specific definitions of the $\alpha_c(j)$ can refer to TS36.213.

In one embodiment, a linear coefficient between the first reference power and the first path loss is $\alpha_{SRS,c}$, and specific definitions of the $\alpha_{SRS,c}$ can refer to TS36.213.

In one embodiment, the third component in the disclosure is equal to the first path loss.

In one embodiment, the first path loss is $PL_c$, and specific definitions of the $PL_c$ can refer to TS36.213.

In one embodiment, the synchronization sequence is used for determining a first-type identifier, and the first-type identifier is an integer.

In one subembodiment, the first-type identifier is one PCI.

In one subembodiment, the first-type identifier identifies a transmitter of a corresponding second radio signal uniquely.

Embodiment 6

Figure 6:
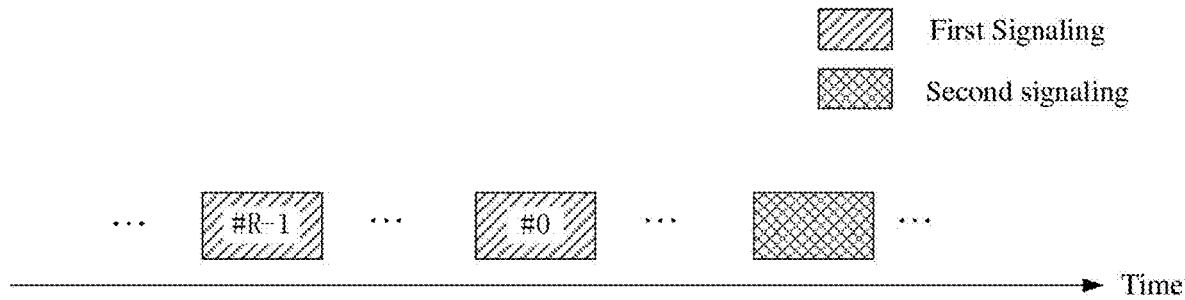
FIG. 6 is a diagram illustrating a time sequence of R first signalings and a second signaling according to one embodiment of the disclosure.

Embodiment 6 illustrates an example of a diagram of a time sequence of R first signalings and a second signaling, as shown in FIG. 6. In FIG. 6, indexes of the R first signaling are #0, #1, #2, . . . , #R−1 respectively.

In Embodiment 6, any two of the R first signalings occupy orthogonal (non-overlapping) time domain resources; time-domain resources occupied by any one of the R first signalings are orthogonal (non-overlapping) to time-domain resources occupied by the second signaling. Time-domain resources occupied by a first signaling #i are before time-domain resources occupied by a first signaling #j, the i and the j are non-negative integers less than R respectively, and the i is greater than the j. Time-domain resources occupied by the second signaling are behind time-domain resources occupied by a latest first signaling, that is, behind time-domain resources occupied by the first signaling #0 shown in FIG. 6.

Embodiment 7

Figure 7:
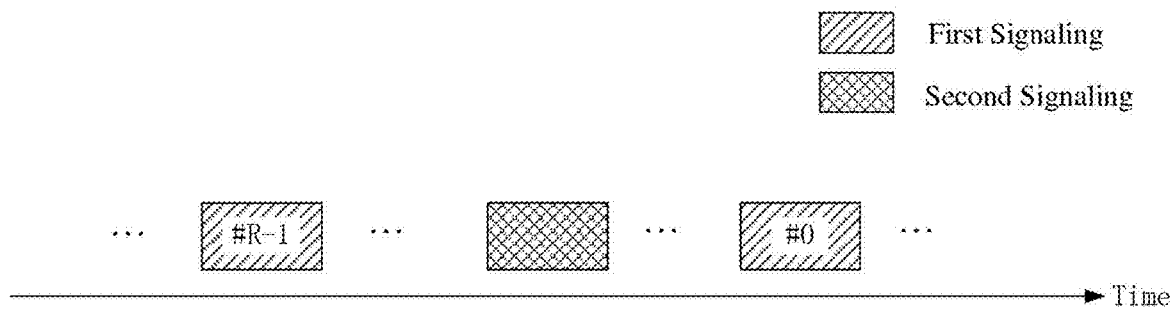
FIG. 7 is a diagram illustrating a time sequence of R first signalings and a second signaling according to another embodiment of the disclosure.

Embodiment 7 illustrates an example of a diagram of a time sequence of R first signalings and a second signaling, as shown in FIG. 7. In FIG. 7, indexes of the R first signaling are #0, #1, #2, . . . , #R−1 respectively.

In Embodiment 7, any two of the R first signalings occupy orthogonal (non-overlapping) time domain resources; time-domain resources occupied by any one of the R first signalings are orthogonal (non-overlapping) to time-domain resources occupied by the second signaling. Time-domain resources occupied by a first signaling #i are before time-domain resources occupied by a first signaling #j, the i and the j are non-negative integers less than R respectively, and the i is greater than the j. Time-domain resources occupied by the second signaling are before time-domain resources occupied by a latest first signaling, that is, before time-domain resources occupied by the first signaling #0 shown in FIG. 7.

Embodiment 8

Figure 8:
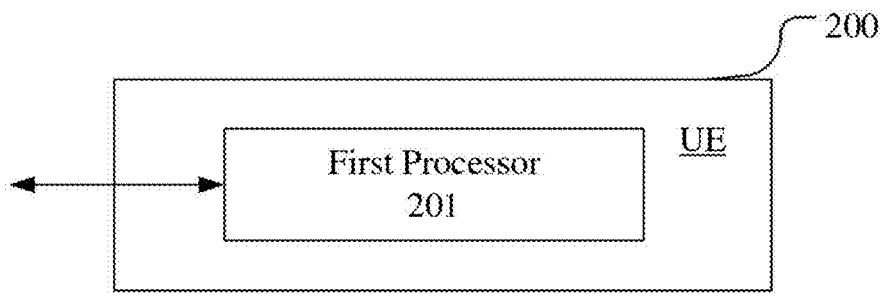
FIG. 8 is a structure block diagram illustrating a processing device in a UE according to one embodiment of the disclosure.

Embodiment 8 illustrates a structure block diagram of a processing device in a UE, as shown in FIG. 8. In FIG. 8, the processing device 200 in the UE is mainly composed of a first processor 201.

In Embodiment 8, the first processor 201 transmits a first radio signal.

In Embodiment 8, the first radio signal occupies W frequency unit(s) in frequency domain, a transmit power of the first radio signal is a first power, the first power is uncorrelated with the W, the W is a positive integer, and the W is configurable In one embodiment, the first processor 201 further receives R first signaling(s), wherein the R first signaling(s) is(are) used by the first processor 201 to determine R first offset(s) respectively, a first reference power is in linear correlation with a summation of the R first offset(s), the first reference power is used by the first processor 201 to determine the first power, and the R is a positive integer In one embodiment, the first processor 201 further receives K second radio signal(s), wherein the K second radio signal(s) is(are) associated with K synchronization sequence(s) respectively, measurement(s) for the K second radio signal(s) is(are) used by the first processor 201 to determine a first path loss, the first path loss is used by the first processor 201 to determine the first power, and the K is a positive integer In one embodiment, the first processor 201 further receives downlink information, wherein the downlink information is used by the first processor 201 to determine configuration information of the first radio signal, and the configuration information includes at least one of occupied time-domain resources, occupied frequency-domain resources, occupied code-domain resources, a cyclic shift or a corresponding antenna port (corresponding antenna ports).

In one embodiment, the first processor 201 further receives a second signaling, wherein the second signaling is used for triggering transmission of the first radio signal.

In one embodiment, the first signaling includes a first field, value(s) of the first field(s) in the R first signaling(s) is(are) all equal to a first index, and the first index is an integer.

In one embodiment, a first signature sequence is used by the first processor 201 to generate the first radio signal.

Embodiment 9

Figure 9:
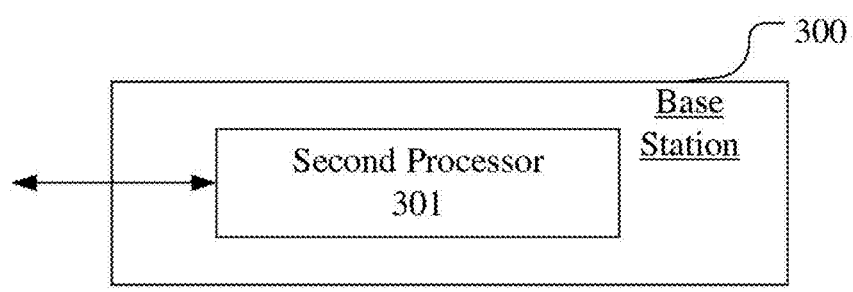
FIG. 9 is a structure block diagram illustrating a processing device in a base station according to one embodiment of the disclosure.

Embodiment 9 illustrates an example of a structure block diagram of a processing device in a base station, as shown in FIG. 9. In FIG. 9, the processing device 300 in the base station is mainly composed of a second processor 301.

In Embodiment 9, the second processor 301 receives a first radio signal/

In Embodiment 9, the first radio signal occupies W frequency unit(s) in frequency domain, a transmit power of the first radio signal is a first power, the first power is uncorrelated with the W, the W is a positive integer, and the W is configurable.

In one embodiment 9, the second processor 301 further transmits R first signaling(s), wherein the R first signaling(s) is(are) used for determining R first offset(s) respectively, a first reference power is in linear correlation with a summation of the R first offset(s), the first reference power is used for determining the first power, the R is a positive integer.

In one embodiment, the second processor 301 further transmits a target second radio signal, wherein K second radio signal(s) is(are) associated with K synchronization sequence(s) respectively, measurement(s) for the K second radio signal(s) is(are) used for determining a first path loss, the first path loss is used for determining the first power, the target second radio signal is one of the K second radio signal(s), and the K is a positive integer.

In one embodiment, the second processor 301 further transmits downlink information, wherein the downlink information is used for determining configuration information of the first radio signal, and the configuration information includes at least one of occupied time-domain resources, occupied frequency-domain resources, occupied code-domain resources, a cyclic shift or a corresponding antenna port (corresponding antenna ports).

In one embodiment, the second processor 301 further transmits a second signaling, wherein the second signaling is used for triggering transmission of the first radio signal.

In one embodiment, the first signaling includes a first field, value(s) of the first field(s) in the R first signaling(s) is(are) all equal to a first index, and the first index is an integer.

In one embodiment, a first signature sequence is used for generating the first radio signal.

Embodiment 10

Figure 10:
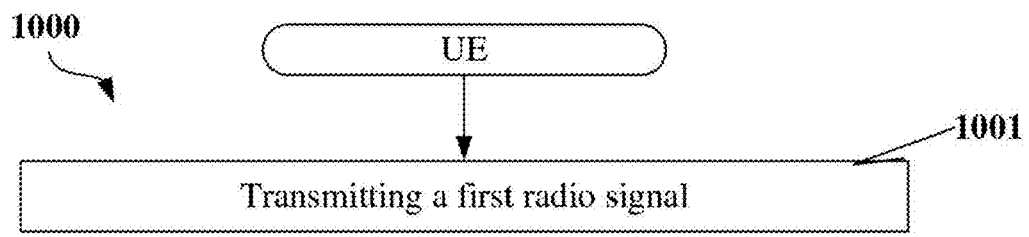
FIG. 10 is a flowchart of first information and a first signaling according to one embodiment of the disclosure.

Embodiment 10 illustrates a flowchart of a first radio signal according to one embodiment of the disclosure, as shown in FIG. 10. In 1000 shown in FIG. 10, each box represents one step.

In Embodiment 10, the UE in the disclosure transmits a first radio signal in S1001, wherein the first radio signal occupies W frequency unit(s) in frequency domain, a transmit power of the first radio signal is a first power, the first power is uncorrelated with the W, the W is a positive integer, and the W is configurable.

In one embodiment, the first radio signal includes an uplink reference signal.

In one embodiment, the first radio signal includes an SRS.

In one embodiment, the first radio signal includes an uplink DMRS.

In one embodiment, a target receiver of the first radio signal includes at least one of a terminal or a base station.

In one subembodiment, the terminal is a terminal used for terrestrial radio access.

In one embodiment, the frequency unit is a bandwidth occupied by one subcarrier.

In one embodiment, the first power is in unit of dBm.

In one embodiment, the first power is $P_{SRS,c}(i)$, the $P_{SRS,c}(i)$ is a transmit power used by the UE to transmits an SRS in an ith subframe in a serving cell indexed with c, and the first radio signal is transmitted in the serving cell indexed with c. Specific definitions of the $P_{SRS,c}(i)$ can refer to TS36.213.

In one embodiment, the first power is equal to a limit power.

In one embodiment, the first power is less than a limit power.

In one embodiment, the limit power is $P_{C\ MAX,c}(i)$, the $P_{C\ MAX,c}(i)$ is a transmit power highest threshold configured by the UE in an ith subframe in a serving cell indexed with c, and the first radio signal is transmitted in the serving cell indexed with c. Specific definitions of the $P_{C\ MAX,c}(i)$ can refer to TS36.213.

In one embodiment, the limit power is configured through a higher-layer signaling.

In one embodiment, the limit power is cell specific.

In one embodiment, the limit power is UE specific.

In one embodiment, the W frequency units are consecutive in frequency domain.

In one embodiment, the W frequency units are not consecutive in frequency domain.

Embodiment 11

Figure 11:
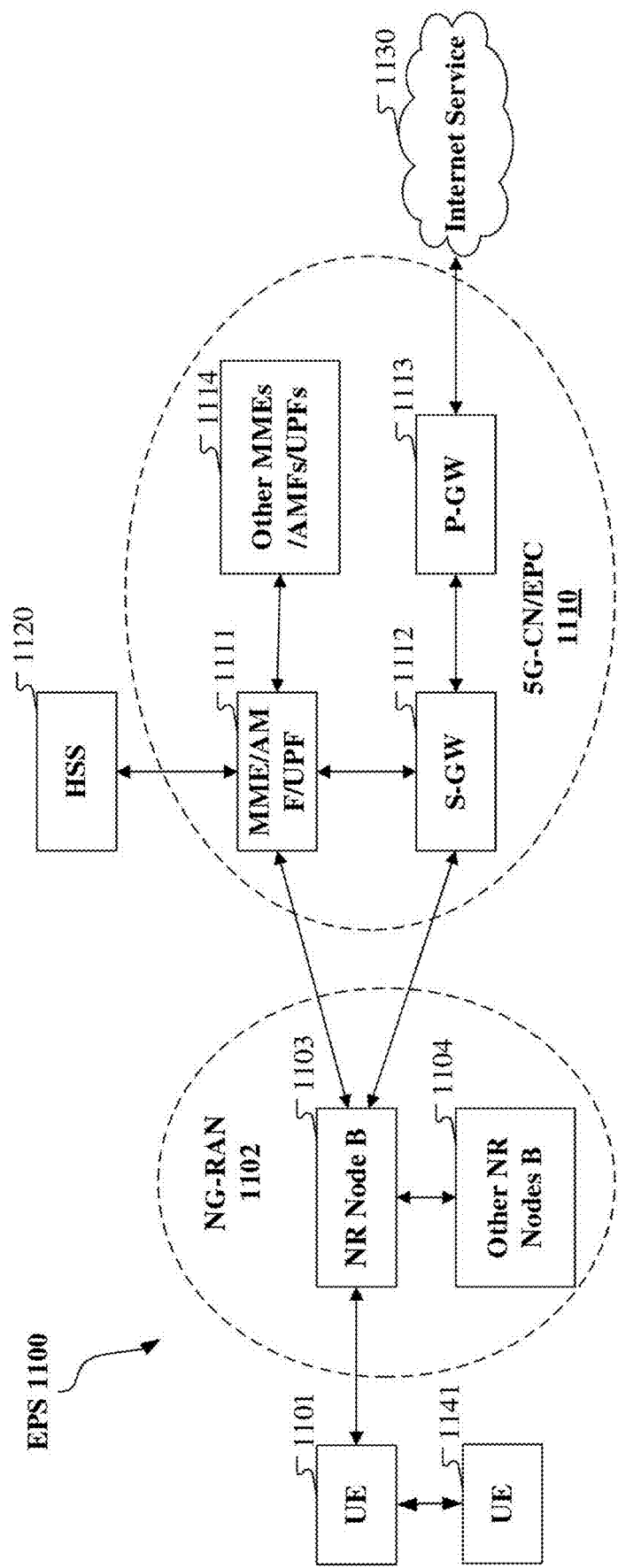
FIG. 11 is a diagram illustrating a network architecture according to one embodiment of the disclosure.

Embodiment 11 illustrates an example of a diagram of a network architecture according to one embodiment of the disclosure, as shown in FIG. 11.

FIG. 11 illustrates a network architecture 1100 of Long-Term Evolution (LTE), Long-Term Evolution Advanced (LTE-A) and future 5G systems. The LTE network architecture 1100 of LTE, LTE-A and future 5G systems may be called an Evolved Packet System (EPS) 1100. The EPS 1100 may include one or more UEs 1101, a UE 1141 in sidelink communication with the UE 1101, a Next Generation-Radio Access Network (NG-RAN) 1102, a 5G-Core Network/Evolved Packet Core (5G-CN/EPC) 1110, a Home Subscriber Server (HSS) 1120 and an Internet Service 1130. The EPS 1100 may be interconnected with other access networks. For simple description, the entities/interfaces are not shown. As shown in FIG. 11, the EPS 1100 provides packet switching services. Those skilled in the art are easy to understand that various concepts presented throughout the present disclosure can be extended to networks providing circuit switching services. The NG-RAN 1102 includes an NR node B (gNB) 1103 and other gNBs 1104. The gNB 1103 provides UE 1101 oriented user plane and control plane protocol terminations. The gNB 1103 may be connected to other gNBs 1104 via an X2 interface (for example, backhaul). The gNB 1103 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 1103 provides an access point of the 5G-CN/EPC 1110 for the UE 1101. Examples of UE 1101 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 1101 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a mobile client or other appropriate terms. The gNB 1103 is connected to the 5G-CN/EPC 1110 via an S1 interface. The 5G-CN/EPC 1110 includes a Mobility Management Entity/Authentication Management Field/User Plane Function (MME/AMF/UPF) 1111, other MMEs/AMFs/UPFs 1114, a Service Gateway (S-GW) 1112 and a Packet Data Network Gateway (P-GW) 1113. The MME 1111 is a control node for processing a signaling between the UE 1101 and the 5G-CN/EPC 1110. Generally, the MME/AMF/UPF 1111 provides bearer and connection management. All user Internet Protocol (IP) packets are transmitted through the S-GW 1112. The S-GW 1112 is connected to the P-GW 1113. The P-GW 1113 provides UE IP address allocation and other functions. The P-GW 1113 is connected to the Internet service 1130. The Internet service 1130 includes IP services corresponding to operators, specifically including Internet, Intranet, IP Multimedia Subsystems (IP IMSs) and Packet Switching Streaming Services (PSSs).

In one embodiment, the UE in the disclosure includes the UE 1101.

In one embodiment, the base station in the disclosure includes the gNB 1103.

In one embodiment, the transmitter of the first radio signal in the disclosure includes the UE 1101.

In one embodiment, the receiver of the first radio signal in the disclosure includes the gNB 1103.

27

In one embodiment, the transmitter of the R first signaling(s) in the disclosure includes the gNB 1103.

In one embodiment, the receiver of the R first signaling(s) in the disclosure includes the UE 1141.

In one embodiment, the transmitter of the K second radio signal(s) in the disclosure includes the gNB 1103.

In one embodiment, the receiver of the K second radio signal(s) in the disclosure includes the UE 1141.

In one embodiment, the transmitter of the downlink information in the disclosure includes the gNB 1103.

In one embodiment, the receiver of the downlink information in the disclosure includes the UE 1141.

In one embodiment, the transmitter of the second signaling in the disclosure includes the gNB 1103.

In one embodiment, the receiver of the second signaling in the disclosure includes the UE 1141.

Embodiment 12

Figure 12:
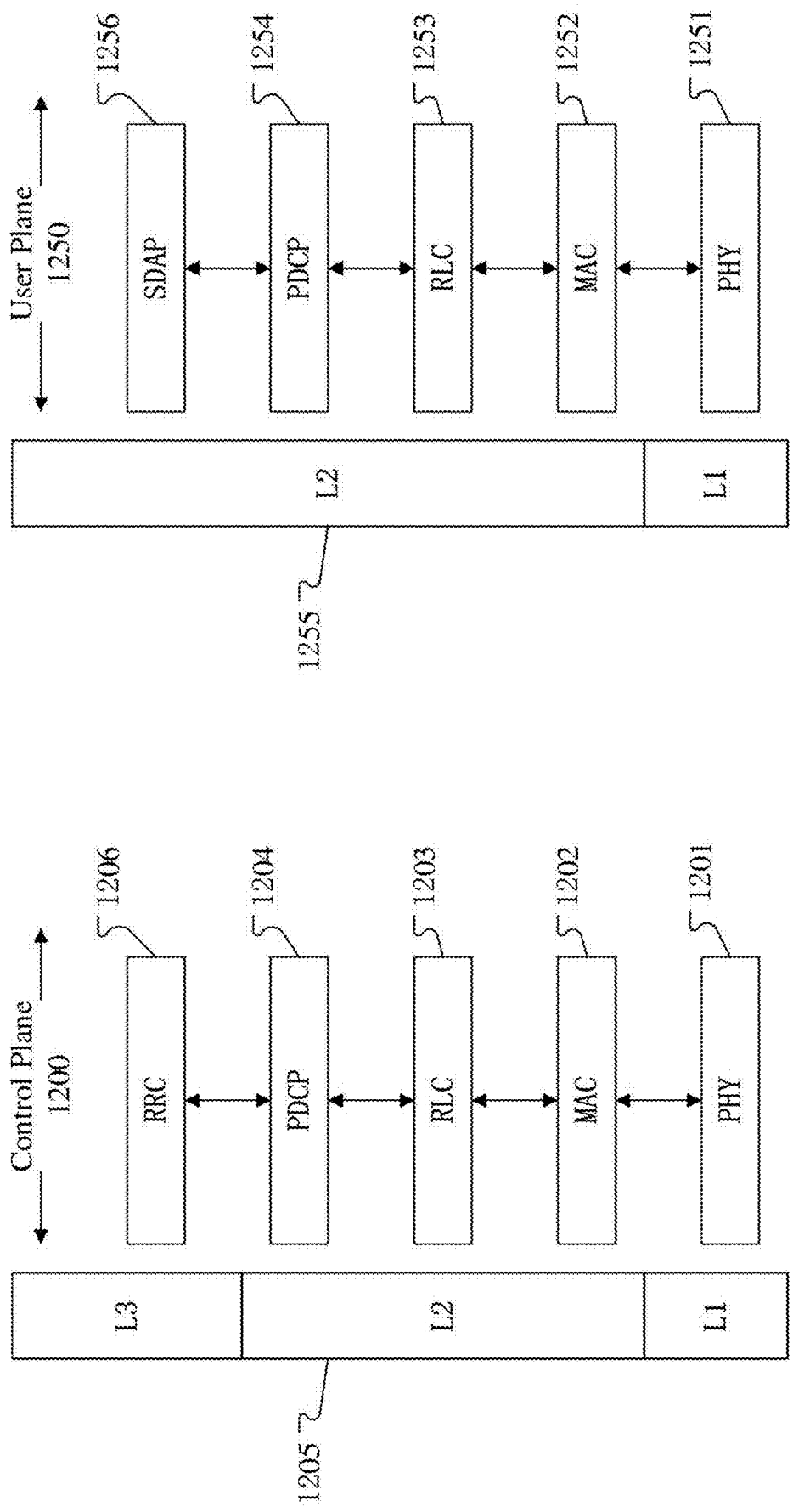
FIG. 12 is a diagram illustrating an embodiment of a radio protocol architecture of a user plane and a control plane according to one embodiment of the disclosure.

Embodiment 12 illustrates an example of a diagram of an embodiment of a radio protocol architecture of a user plane and a control plane according to one embodiment of the disclosure, as shown in FIG. 12.

Embodiment 12 illustrates a diagram of an embodiment of a radio protocol architecture of a user plane and a control plane according to the disclosure, as shown in FIG. 12. FIG. 12 is a diagram illustrating an embodiment of a radio protocol architecture of a user plane 1250 and a control plane 1200. In FIG. 12, the radio protocol architecture of a control plane 1200 between a first communication node (UE, gNB or RSU in V2X) and a second communication node (gNB, UE or RSU in V2X) or between two UEs is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 1201. The Layer 2 (L2 layer) 1205 is above the PHY 1201, and is responsible for the link between the first communication node and the second communication node. The L2 Layer 1205 includes a Medium Access Control (MAC) sublayer 1202, a Radio Link Control (RLC) sublayer 1203, and a Packet Data Convergence Protocol (PDCP) sublayer 1204, which are terminated at the second communication node. The PDCP sublayer 1204 provides multiplexing between different radio bearers and logical channels. The PDCP sublayer 1204 also provides security by encrypting packets and provides support for handover of the first communication node between the second communication nodes. The RLC sublayer 1203 provides segmentation and reassembling of higher-layer packets, retransmission of lost packets, and reordering of lost packets to as to compensate for out-of-order reception due to HARQ. The MAC sublayer 1202 provides multiplexing between logical channels and transport channels. The MAC sublayer 1202 is also responsible for allocating various radio resources (i.e., resource blocks) in one cell among the first communication nodes. The MAC sublayer 1202 is also in charge of HARQ operations. The RRC sublayer 1206 in the Layer 3 (L3 layer) in the control plane 1200 is responsible for acquiring radio resources (i.e. radio bearers) and configuring lower layers using an RRC signaling between the second communication node and the first communication node. The radio protocol architecture of the user plane 1250 includes a Layer 1 (L1 layer) and a Layer 2 (L2 layer); the radio protocol architecture for the first communication node and the second communication node in the user plane 1250 on the PHY 1251, the PDCP sublayer 1254 in the L2 Layer 1255, the RLC sublayer 1253 in the L2 Layer 1255 and the MAC sublayer 1252 in the L2 Layer 1255 is substantially the same as the radio protocol architecture on corresponding layers and sublayers in the control plane 1200, with the exception that the PDCP sublayer 1254 also provides header compression for higher-layer packets so as to reduce radio transmission overheads. The L2 Layer 1255 in the user plane 1250 further includes a Service Data Adaptation Protocol (SDAP) sublayer 1256; the SDAP sublayer 1256 is in charge of mappings between QoS flows and Data Radio Bearers (DRBs), so as to support diversification of services. Although not shown, the first communication node may include several higher layers above the L2 Layer 1255, including a network layer (i.e. IP layer) terminated at the P-GW on the network side and an application layer terminated at the other end (i.e. a peer UE, a server, etc.) of the connection.

In one embodiment, the radio protocol architecture shown in FIG. 12 is applicable to the UE in the disclosure.

In one embodiment, the radio protocol architecture shown in FIG. 12 is applicable to the base station in the disclosure.

In one embodiment, the first radio signal is generated on the PHY 1201 or the PHY 1251.

In one embodiment, the R first signaling(s) is(are) generated on the PHY 1201 or the PHY 1251.

In one embodiment, the R first signaling(s) is(are) generated on the MAC sublayer 1202 or the MAC sublayer 1252.

In one embodiment, the K second radio signal(s) is(are) generated on the PHY 1201 or the PHY 1251.

In one embodiment, the downlink information is generated on the RRC sublayer 1206.

In one embodiment, the second signaling is generated on the PHY 1201 or the PHY 1251.

In one embodiment, the second signaling is generated on the MAC sublayer 1202 or the MAC sublayer 1252.

Embodiment 13

Figure 13:
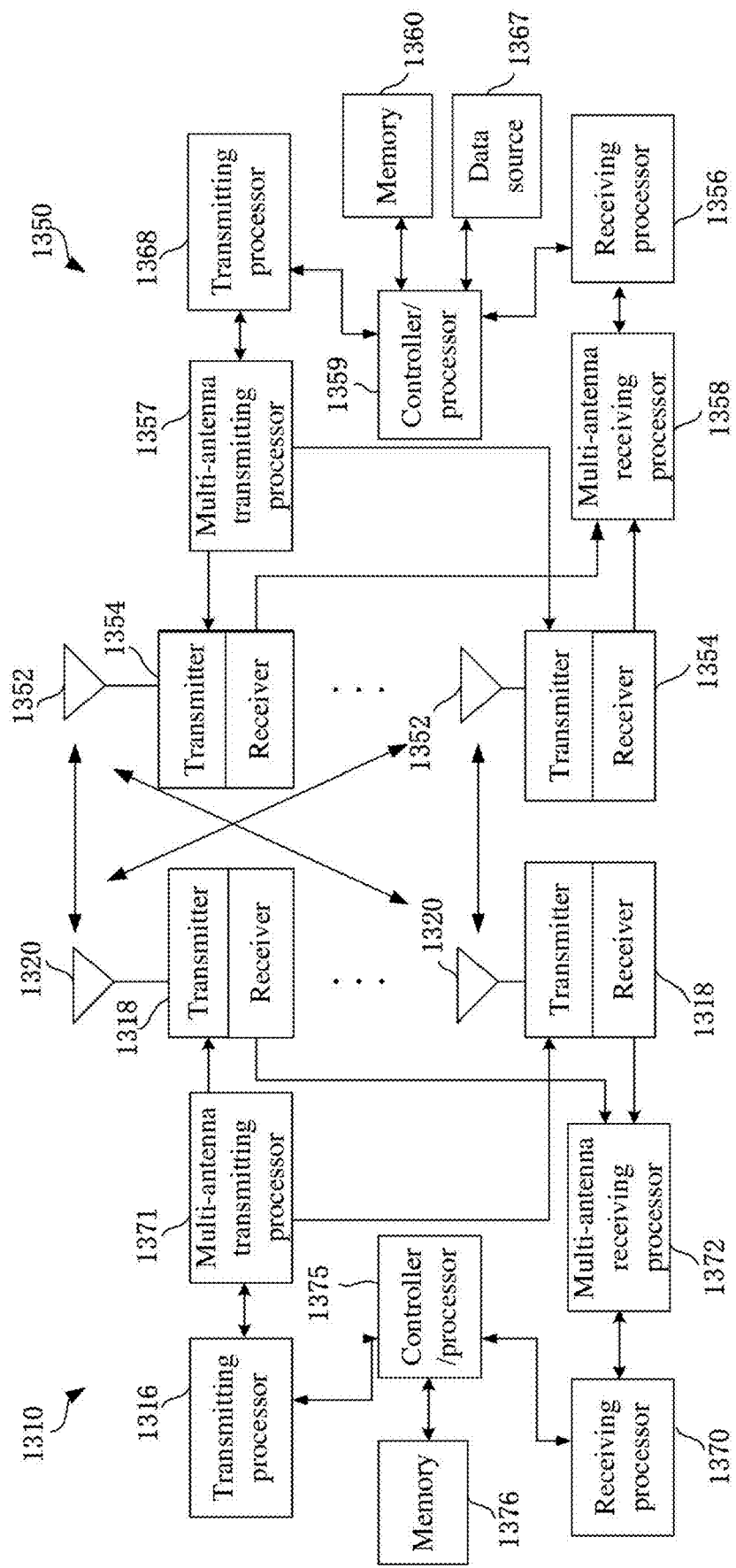
FIG. 13 is a diagram illustrating a first communication equipment and a second communication equipment according to one embodiment of the disclosure.

Embodiment 13 illustrates an example of a diagram of a first communication equipment and a second communication equipment according to one embodiment of the disclosure, as shown in FIG. 13. FIG. 13 is a block diagram of a first communication equipment 1310 and a second communication equipment 1350 that are in communication with each other in an access network.

The first communication equipment 1310 includes a controller/processor 1375, a memory 1376, a receiving processor 1370, a transmitting processor 1316, a multi-antenna receiving processor 1372, a multi-antenna transmitting processor 1371, a transmitter/receiver 1318 and an antenna 1320.

The second communication equipment 1350 includes a controller/processor 1359, a memory 1360, a data source 1367, a transmitting processor 1368, a receiving processor 1356, a multi-antenna transmitting processor 1357, a multi-antenna receiving processor 1358, a transmitter/receiver 1354 and an antenna 1352.

In a transmission from the first communication equipment 1310 to the second communication equipment 1350, at the first communication equipment 1310, a higher-layer packet from a core network is provided to the controller/processor 1375. The controller/processor 1375 provides functions of Layer 2. In DL, the controller/processor 1375 provides header compression, encryption, packet segmentation and reordering, multiplexing between a logical channel and a transport channel, and a radio resource allocation for the second communication equipment 1350 based on various priority metrics. The controller/processor 1375 is also in charge of HARQ operation, retransmission of lost packets, and signalings to the second communication equipment 1350. The transmitting processor 1316 and the multi-antenna transmitting processor 1371 perform various signal processing functions used for Layer 1 (that is, PHY). The transmitting processor 1316 performs encoding and interleaving so as to ensure FEC (Forward Error Correction) at the second communication equipment 1350 and mappings to signal clusters corresponding to different modulation schemes (i.e., BPSK, QPSK, M-PSK M-QAM, etc.). The multi-antenna transmitting processor 1371 processes the encoded and modulated symbols with digital spatial precoding (including precoding based on codebook and precoding based on non-codebook) and beamforming to generate one or more spatial streams. The transmitting processor 1316 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 1371 processes the time-domain multicarrier symbol streams with a transmitting analog precoding/beamforming operation. Each transmitter 1318 converts a baseband multicarrier symbol stream provided by the multi-antenna transmitting processor 1371 into a radio frequency stream and then provides it to different antennas 1320.

In a transmission from the first communication equipment 1310 to the second communication equipment 1350, at the second communication equipment 1350, each receiver 1354 receives a signal via the corresponding antenna 1352. Each receiver 1354 recovers the information modulated to the RF carrier and converts the radio frequency stream into a baseband multicarrier symbol stream to provide to the receiving processor 1356. The receiving processor 1356 and the multi-antenna receiving processor 1358 perform various signal processing functions of Layer 1. The multi-antenna receiving processor 1358 processes the baseband multicarrier symbol stream coming from the receiver 1354 with a receiving analog precoding/beamforming operation. The receiving processor 1356 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 1356, wherein the reference signal is used for channel estimation, and the data signal is subjected to multi-antenna detection in the multi-antenna receiving processor 1358 to recover any spatial stream targeting the UE 1350. Symbols on each spatial stream are demodulated and recovered in the receiving processor 1356 to generate a soft decision. Then, the receiving processor 1356 decodes and de-interleaves the soft decision to recover the higher-layer data and control signal on the physical channel transmitted by the first communication equipment 1310. Next, the higher-layer data and control signal are provided to the controller/processor 1359. The controller/processor 1359 performs functions of Layer 2. The controller/processor 1359 may be connected to the memory 1360 that stores program codes and data. The memory 1360 may be called a computer readable media. In DL, the controller/processor 1359 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 1359 can also perform error detection using ACK and/or NACK protocols to support the HARQ operation.

In a transmission from the second communication equipment 1350 to the first communication equipment 1310, at the second communication equipment 1350, the data source 1367 provides a higher-layer packet to the controller/processor 1359. The data source 1367 illustrates all protocol layers above the L2 layer. Similar as the transmitting function of the first communication equipment 1310 described in DL, the controller/processor 1359 provides header compression, encryption, packet segmentation and reordering, and multiplexing between a logical channel and a transport channel based on radio resource allocation of the first communication equipment 1310 so as to provide the functions of L2 layer used for the control plane and user plane. The controller/processor 1359 is also in charge of HARQ operation, retransmission of lost packets, and signalings to the first communication equipment 1310. The transmitting processor 1368 conducts modulation mapping and channel encoding processing; the multi-antenna transmitting processor 1357 performs digital multi-antenna spatial precoding (including precoding based on codebook and precoding based on non-codebook) and beamforming processing; and subsequently, the transmitting processor 1368 modulates the generated spatial streams into a multicarrier/single-carrier symbol stream, which is subjected to an analog precoding/beamforming operation in the multi-antenna transmitting processor 1357 and then is provided to different antennas 1352 via the transmitter 1354. Each transmitter 1352 first converts the baseband symbol stream provided by the multi-antenna transmitting processor 1357 into a radio frequency symbol stream and then provides the radio frequency symbol stream to the antenna 1352.

In a transmission from the second communication equipment 1350 to the first communication equipment 1310, the function of the first communication equipment 1310 is similar as the receiving function of the second communication equipment 1350 described in the transmission from first communication equipment 1310 to the second communication equipment 1350. Each receiver 1318 receives a radio frequency signal via the corresponding antenna 1320, converts the received radio frequency signal into a baseband signal, and provides the baseband signal to the multi-antenna receiving processor 1372 and the receiving processor 1370. The receiving processor 1370 and the multi-antenna receiving processor 1372 together provide functions of Layer 1. The controller/processor 1375 provides functions of Layer 2. The controller/processor 1375 may be connected to the memory 1376 that stores program codes and data. The memory 1376 may be called a computer readable media. The controller/processor 1375 provides de-multiplexing between the transport channel and the logical channel, packet reassembling, decryption, header decompression, and control signal processing so as to recover higher-layer packets coming from the UE 1350. The higher-layer packet, coming from the controller/processor 1375, may be provided to the core network. The controller/processor 1375 can also perform error detection using ACK and/or NACK protocols to support the HARQ operation.

In one embodiment, the second communication equipment 1350 includes at least one processor and at least one memory. The at least one memory includes computer program codes. The at least one memory and the computer program codes are configured to be used in collaboration with the at least one processor. The second communication equipment 1350 at least transmits the first radio signal in the disclosure, wherein the first radio signal occupies W frequency unit(s) in frequency domain, a transmit power of the first radio signal is a first power, the first power is uncorrelated with the W, the W is a positive integer, and the W is configurable.

In one embodiment, the second communication equipment 1350 includes a memory that stores a computer readable instruction program. The computer readable instruction program generates an action when executed by at least one processor. The action includes: transmitting the first radio signal in the disclosure, wherein the first radio signal occupies W frequency unit(s) in frequency domain, a transmit power of the first radio signal is a first power, the first power is uncorrelated with the W, the W is a positive integer, and the W is configurable.

In one embodiment, the first communication equipment 1310 includes at least one processor and at least one memory. The at least one memory includes computer program codes. The at least one memory and the computer program codes are configured to be used in collaboration with the at least one processor. The first communication equipment 1310 at least receives the first radio signal in the disclosure, wherein the first radio signal occupies W frequency unit(s) in frequency domain, a transmit power of the first radio signal is a first power, the first power is uncorrelated with the W, the W is a positive integer, and the W is configurable.

In one embodiment, the first communication equipment 1310 includes a memory that stores a computer readable instruction program. The computer readable instruction program generates an action when executed by at least one processor. The action includes: receiving the first radio signal in the disclosure, wherein the first radio signal occupies W frequency unit(s) in frequency domain, a transmit power of the first radio signal is a first power, the first power is uncorrelated with the W, the W is a positive integer, and the W is configurable.

In one embodiment, the base station in the disclosure includes the first communication equipment 1310.

In one embodiment, the UE in the disclosure includes the second communication equipment 1350.

In one embodiment, at least one of the antenna 1320, the receiver 1318, the receiving processor 1370, the multi-antenna receiving processor 1372, the controller/processor 1375 or the memory 1376 is used for receiving the first radio signal in the disclosure; and at least one of the antenna 1352, the transmitter 1354, the transmitting processor 1368, the multi-antenna transmitting processor 1357, the controller/processor 1359, the memory 1360 or the data source 1367 is used for transmitting the first radio signal in the disclosure.

In one embodiment, at least one of the antenna 1352, the receiver 1354, the receiving processor 1356, the multi-antenna receiving processor 1358, the controller/processor 1359, the memory 1360 or the data source 1367 is used for receiving the R first signaling(s) in the disclosure; and at least one of the antenna 1320, the transmitter 1318, the transmitting processor 1316, the multi-antenna transmitting processor 1371, the controller/processor 1375 or the memory 1376 is used for transmitting the R first signaling(s) in the disclosure.

In one embodiment, at least one of the antenna 1352, the receiver 1354, the receiving processor 1356, the multi-antenna receiving processor 1358, the controller/processor 1359, the memory 1360 or the data source 1367 is used for receiving the K second radio signal(s) in the disclosure; and at least one of the antenna 1320, the transmitter 1318, the transmitting processor 1316, the multi-antenna transmitting processor 1371, the controller/processor 1375 or the memory 1376 is used for transmitting the K second radio signal(s) in the disclosure.

In one embodiment, at least one of the antenna 1352, the receiver 1354, the receiving processor 1356, the multi-antenna receiving processor 1358, the controller/processor 1359, the memory 1360 or the data source 1367 is used for receiving the downlink information in the disclosure; and at least one of the antenna 1320, the transmitter 1318, the transmitting processor 1316, the multi-antenna transmitting processor 1371, the controller/processor 1375 or the memory 1376 is used for transmitting the downlink information in the disclosure.

In one embodiment, at least one of the antenna 1352, the receiver 1354, the receiving processor 1356, the multi-antenna receiving processor 1358, the controller/processor 1359, the memory 1360 or the data source 1367 is used for receiving the second signaling in the disclosure; and at least one of the antenna 1320, the transmitter 1318, the transmitting processor 1316, the multi-antenna transmitting processor 1371, the controller/processor 1375 or the memory 1376 is used for transmitting the second signaling in the disclosure.

In one embodiment, the first processor 201 in Embodiment 8 includes at least one of the antenna 1352, the transmitter/receiver 1354, the receiving processor 1356, the transmitting processor 1368, the multi-antenna receiving processor 1358, the multi-antenna transmitting processor 1357, the controller/processor 1359, the memory 1360 or the data source 1367.

In one embodiment, the second processor 301 in Embodiment 9 includes at least one of the antenna 1320, the transmitter/receiver 1318, the receiving processor 1370, the transmitting processor 1316, the multi-antenna receiving processor 1372, the multi-antenna transmitting processor 1371, the controller/processor 1375 or the memory 1376.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
   receiving K second radio signals;
   transmitting a first radio signal;
   wherein the first radio signal occupies W frequency unit(s) in frequency domain; a transmit power of the first radio signal is a first power; the first power is uncorrelated with the W; the W is a positive integer; the W is configurable; and the first radio signal includes an uplink reference signal; the K second radio signals are associated with K synchronization sequences respectively, measurements for the K second radio signals are used for determining a first path loss, the first path loss is used for determining the first power, and the K is a positive integer greater than 1; the K second radio signals come from K different nodes respectively, and the node is one of a cell, a base station or a TRP (Transmission Reception Point).

2. The method according to claim 1, comprising:
   receiving R first signaling(s);
   wherein the R first signaling(s) is(are) used for determining R first offset(s) respectively, a first reference power is in linear correlation with a summation of the R first offset(s), the first reference power is used for determining the first power, and the R is a positive integer;
   or, comprising:
   receiving R first signaling(s);
   wherein the R first signaling(s) is(are) used for determining R first offset(s) respectively, a first reference power is in linear correlation with a summation of the R first offset(s), the first reference power is used for determining the first power, the R is a positive integer, the first signaling comprises a first field, value(s) of the first field(s) in the R first signaling(s) is(are) all equal to a first index, and the first index is an integer.

3. The method according to claim 1, comprising:
   receiving downlink information;
   wherein the downlink information is used for determining configuration information of the first radio signal, and the configuration information comprises at least one of occupied time-domain resources, occupied frequency-domain resources, occupied code-domain resources, a cyclic shift or a corresponding antenna port (corresponding antenna ports);
   or, comprising:
   receiving a second signaling;
   wherein the second signaling is used for triggering transmission of the first radio signal.

4. The method according to claim 1, wherein a first signature sequence is used for generating the first radio signal.

5. A method in a base station for wireless communication, comprising:
   transmitting a target second radio signal;
   receiving a first radio signal;
   wherein the first radio signal occupies W frequency unit(s) in frequency domain; a transmit power of the first radio signal is a first power; the first power is uncorrelated with the W; the W is a positive integer; the W is configurable; and the first radio signal includes an uplink reference signal; K second radio signals are associated with K synchronization sequences respectively, measurements for the K second radio signals are used for determining a first path loss, the first path loss is used for determining the first power, the target second radio signal is one of the K second radio signals, and the K is a positive integer greater than 1; the K second radio signals come from K different nodes respectively, and the node is one of a cell, a base station or a TRP (Transmission Reception Point).

6. The method according to claim 5, comprising:
   transmitting R first signaling(s);
   wherein the R first signaling(s) is(are) used for determining R first offset(s) respectively, a first reference power is in linear correlation with a summation of the R first offset(s), the first reference power is used for determining the first power, and the R is a positive integer;
   or, comprising:
   transmitting R first signaling(s);
   wherein the R first signaling(s) is(are) used for determining R first offset(s) respectively, a first reference power is in linear correlation with a summation of the R first offset(s), the first reference power is used for determining the first power, the R is a positive integer, the first signaling comprises a first field, value(s) of the first field(s) in the R first signaling(s) is(are) all equal to a first index, and the first index is an integer.

7. The method according to claim 5, comprising:
   transmitting downlink information;
   wherein the downlink information is used for determining configuration information of the first radio signal, and the configuration information comprises at least one of occupied time-domain resources, occupied frequency-domain resources, occupied code-domain resources, a cyclic shift or a corresponding antenna port (corresponding antenna ports);
   or, comprising:
   transmitting a second signaling;
   wherein the second signaling is used for triggering transmission of the first radio signal.

8. The method according to claim 5, wherein a first signature sequence is used for generating the first radio signal.

9. A UE for wireless communication, comprising:
   a first processor, to receive K second radio signals and transmit a first radio signal;
   wherein the first radio signal occupies W frequency unit(s) in frequency domain; a transmit power of the first radio signal is a first power, the first power is uncorrelated with the W; the W is a positive integer; the W is configurable; and the first radio signal includes an uplink reference signal; the K second radio signals are associated with K synchronization sequences respectively, measurements for the K second radio signals are used for determining a first path loss, the first path loss is used for determining the first power, and the K is a positive integer greater than 1; the K second radio signals come from K different nodes respectively, and the node is one of a cell, a base station or a TRP (Transmission Reception Point).

10. The UE according to claim 9, wherein the first processor receives R first signaling(s), wherein the R first signaling(s) is(are) used for determining R first offset(s) respectively, a first reference power is in linear correlation with a summation of the R first offset(s), the first reference power is used for determining the first power, and the R is a positive integer;
    or, the first processor receives R first signaling(s), wherein the R first signaling(s) is(are) used for determining R first offset(s) respectively, a first reference power is in linear correlation with a summation of the R first offset(s), the first reference power is used for determining the first power, the R is a positive integer, the first signaling comprises a first field, value(s) of the first field(s) in the R first signaling(s) is(are) all equal to a first index, and the first index is an integer.

11. The UE according to claim 9, wherein the first processor receives downlink information, wherein the downlink information is used for determining configuration information of the first radio signal, and the configuration information comprises at least one of occupied time-domain resources, occupied frequency-domain resources, occupied code-domain resources, a cyclic shift or a corresponding antenna port (corresponding antenna ports);
or, the first processor receives a second signaling, wherein the second signaling is used for triggering transmission of the first radio signal.

12. The UE according to claim 9, wherein a first signature sequence is used for generating the first radio signal.

13. A base station for wireless communication, comprising:
a second processor, to transmit a target second radio signal and receive a first radio signal;
wherein the first radio signal occupies W frequency unit(s) in frequency domain; a transmit power of the first radio signal is a first power; the first power is uncorrelated with the W; the W is a positive integer; the W is configurable; and the first radio signal includes an uplink reference signal; K second radio signals are associated with K synchronization sequences respectively, measurements for the K second radio signals are used for determining a first path loss, the first path loss is used for determining the first power, the target second radio signal is one of the K second radio signals, and the K is a positive integer greater than 1; the K second radio signals come from K different nodes respectively, and the node is one of a cell, a base station or a TRP (Transmission Reception Point).

14. The base station according to claim 13, wherein the second processor transmits R first signaling(s), wherein the R first signaling(s) is(are) used for determining R first offset(s) respectively, a first reference power is in linear correlation with a summation of the R first offset(s), the first reference power is used for determining the first power, the R is a positive integer;
or, the second processor transmits R first signaling(s), wherein the R first signaling(s) is(are) used for determining R first offset(s) respectively, a first reference power is in linear correlation with a summation of the R first offset(s), the first reference power is used for determining the first power, the R is a positive integer, the first signaling comprises a first field, value(s) of the first field(s) in the R first signaling(s) is(are) all equal to a first index, and the first index is an integer.

15. The base station according to claim 13, wherein the second processor transmits downlink information, wherein the downlink information is used for determining configuration information of the first radio signal, and the configuration information comprises at least one of occupied time-domain resources, occupied frequency-domain resources, occupied code-domain resources, a cyclic shift or a corresponding antenna port (corresponding antenna ports);
or, the second processor transmits a second signaling, wherein the second signaling is used for triggering transmission of the first radio signal.

16. The base station according to claim 13, wherein a first signature sequence is used for generating the first radio signal.

* * * * *